US012566570B2

(12) United States Patent
Grymel et al.

(10) Patent No.: US 12,566,570 B2
(45) Date of Patent: Mar. 3, 2026

(54) WRITE COMBINE BUFFER (WCB) FOR DEEP NEURAL NETWORK (DNN) ACCELERATOR

(71) Applicant: Intel Corporation, Santa Clara, CA (US)

(72) Inventors: Martin-Thomas Grymel, Leixlip (IE); David Thomas Bernard, Kilcullen (IE); Martin Power, Dublin (IE); Niall Hanrahan, Galway (IE); Kevin Brady, Newry (GB)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 17/946,311

(22) Filed: Sep. 16, 2022

(65) Prior Publication Data

US 2023/0020929 A1      Jan. 19, 2023

(51) Int. Cl.
*G06F 3/06* (2006.01)
*G06N 3/045* (2023.01)

(52) U.S. Cl.
CPC .......... *G06F 3/0656* (2013.01); *G06F 3/0604* (2013.01); *G06F 3/0673* (2013.01); *G06N 3/045* (2023.01)

(58) Field of Classification Search
None
See application file for complete search history.

(56) References Cited

U.S. PATENT DOCUMENTS

| | | | | |
|---|---|---|---|---|
| 9,710,265 | B1 * | 7/2017 | Temam | G06F 9/3824 |
| 11,514,291 | B2 * | 11/2022 | Baum | G06N 3/08 |
| 11,531,873 | B2 * | 12/2022 | Boesch | G06N 3/0464 |
| 11,934,824 | B2 * | 3/2024 | Yudanov | G06F 9/30032 |
| 2020/0110983 | A1 * | 4/2020 | Chen | G06F 13/362 |
| 2022/0180187 | A1 * | 6/2022 | Kim | G06N 3/0464 |
| 2022/0188611 | A1 * | 6/2022 | Hazanchuk | G06N 3/0464 |

OTHER PUBLICATIONS

Sze, Vivienne et al Efficient processing of deep neural networks. Synthesis Lectures on Computer Architecture. Jun. 24, 2020;15(2):1-341, retrieved from https://people.csail.mit.edu on Sep. 16, 2022.

(Continued)

*Primary Examiner* — Elias Mamo
(74) *Attorney, Agent, or Firm* — Akona IP PC

(57) ABSTRACT

A compute tile includes a WCB that receives a workload of writing an output tensor of a convolution into a local memory of the compute tile. The local memory may be a SRAM. The WCB receives write transactions. A write transaction includes a data block, which is a part of the output tensor, and metadata describing one or more attributes of the data block. The WCB may store write transactions in its internal buffers. The WCB may determine whether to combine two write transactions, e.g., based on an operation mode or metadata in the write transactions. In embodiments where the WCB determines to combine the two write transactions, the WCB may combine the two write transactions into a new write transaction and write the new write transaction into the local memory or an internal memory of the WCB. The total number of write transactions for the workload can be reduced.

25 Claims, 15 Drawing Sheets

(56)             References Cited

OTHER PUBLICATIONS

Williams, Samuel et al "Roofline: An insightful visual performance model for floating-point programs and multicore architectures", Commun. ACM 52 4 (Apr. 2009, 65-76 (https://doi.org/10.1145/1498765.1498785).

Chakrabarti et al., Scaling Intel(R) Software Guard Extensions Applications with Intel(R) SGX Card, (c) 2019 978-1-4503-7226—Aug. 19, 2006, 9 pages.

Shawahna et al., FPGA-Based Accelerators of Deep Learning Networks for Learning and Classification: A Review, (c) 2018 IEEE Access, 37 pages.

Shen et al., Escher: A CNN Accelerator with Flexible Buffering to Minimize Off-Chip Transfer, 2017 IEEE 25th Annual International Symposium on Field-Programmable Custom Computing Machines, 8 pages.

Zheng et al., Hardware Architecture Exploration for Deep Neural Networks, Arabian Journal for Science and Engineering (2021) 46:9703-9712, 10 pages.

Qiu et al., Going Deeper with Embedded FPGA Platform for Convolutional Neural Network, (c) 2016 ACM, 978-1-4503-3856—Jan. 16, 2002, 10 pages.

* cited by examiner

DNN 100

Object 115

Object 125

Object 135

Input Image 105

Convolutional Layer 110

Pooling Layer 120

Fully Connected Layer 130

Bytes

| Write Transaction | Address | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 411 | 0x200 | 1 | 0 | 1 | 0 | 0 | 0 | 0 | 0 | 1 | 1 | 0 | 0 | 1 | 1 | 1 | 1 |  |  |  |  |  |  |  |  |  |  |  |  |  |  |  | 0 |
| 412 | 0x200 | 1 | 0 | 1 | 0 | 0 | 0 | 0 | 0 | 1 | 1 | 0 | 0 | 1 | 1 | 1 | 1 | 0 | 0 | 0 | 0 | 0 | 0 | 0 | 0 | 0 | 0 | 0 | 0 | 0 | 0 | 0 | 1 |
| 421 | 0x210 |  |  |  |  |  |  |  |  |  |  |  |  |  |  |  |  | 1 | 1 | 1 | 1 | 1 | 0 | 0 | 0 | 0 | 0 | 0 | 0 | 0 | 0 | 1 | 1 |
| 422 | 0x200 | 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 1 | 1 |
| 423 | 0x200 | 1 | 0 | 1 | 0 | 0 | 0 | 0 | 0 | 1 | 1 | 0 | 0 | 1 | 1 | 1 | 1 | 1 | 1 | 1 | 1 | 1 | 0 | 0 | 0 | 0 | 0 | 0 | 0 | 0 | 0 | 1 | 1 |
| 431 | 0x210 |  |  |  |  |  |  |  |  |  |  |  |  |  |  |  |  |  | 0 | 0 | 0 | 0 | 1 | 1 | 1 | 1 | 1 | 1 | 1 | 1 | 1 | 0 | 0 |
| 432 | 0x200 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 0 | 0 |
| 433 | 0x200 | 1 | 0 | 1 | 0 | 0 | 0 | 0 | 0 | 1 | 1 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 441 | 0x200 | 0 | 1 | 0 | 1 | 1 | 1 | 1 | 1 | 0 | 0 | 1 | 1 | 0 | 0 | 0 | 0 |  |  |  |  |  |  |  |  |  |  |  |  |  |  |  |  |
| 442 | 0x200 | 0 | 1 | 0 | 1 | 1 | 1 | 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 443 | 0x200 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

FIG. 4B

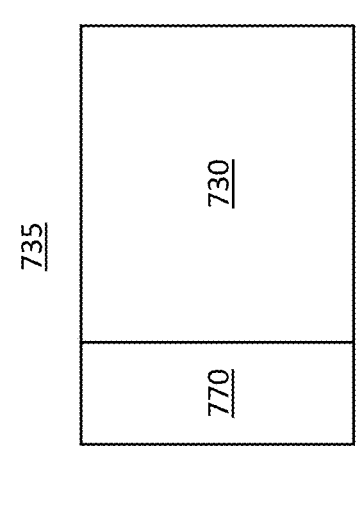
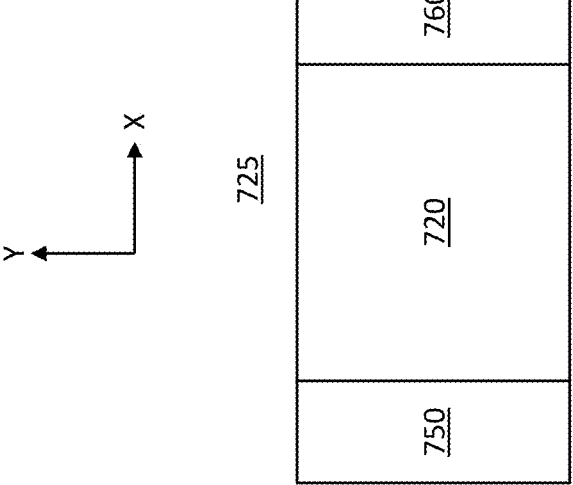
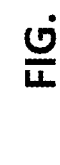
FIG. 7

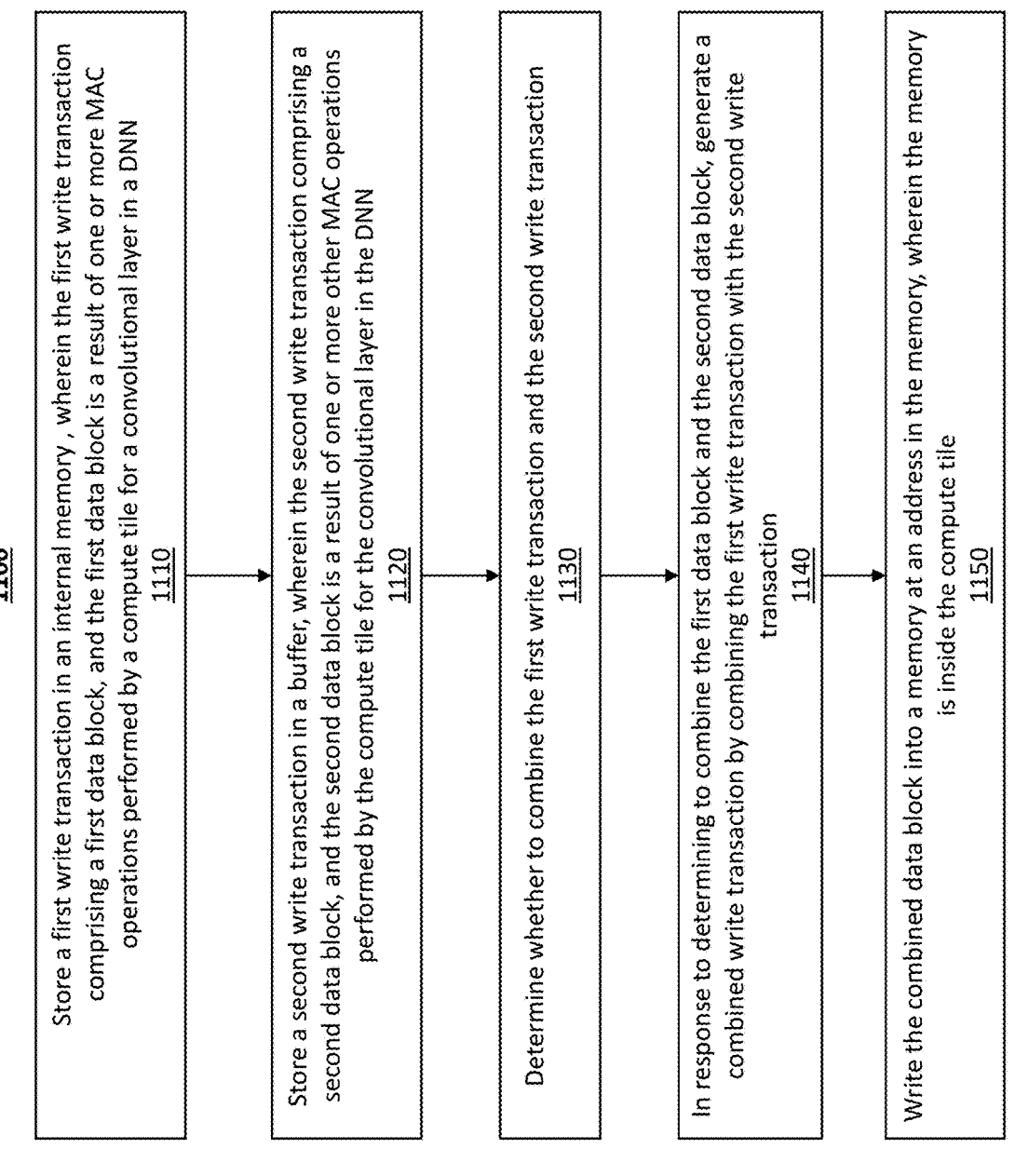

1100

Store a first write transaction in an internal memory , wherein the first write transaction comprising a first data block, and the first data block is a result of one or more MAC operations performed by a compute tile for a convolutional layer in a DNN
1110

Store a second write transaction in a buffer, wherein the second write transaction comprising a second data block, and the second data block is a result of one or more other MAC operations performed by the compute tile for the convolutional layer in the DNN
1120

Determine whether to combine the first write transaction and the second write transaction
1130

In response to determining to combine the first data block and the second data block, generate a combined write transaction by combining the first write transaction with the second write transaction
1140

Write the combined data block into a memory at an address in the memory, wherein the memory is inside the compute tile
1150

FIG. 11

WRITE COMBINE BUFFER (WCB) FOR DEEP NEURAL NETWORK (DNN) ACCELERATOR

TECHNICAL FIELD

This disclosure relates generally to neural networks, and more specifically, WCBs for DNN accelerators.

BACKGROUND

DNNs are used extensively for a variety of artificial intelligence applications ranging from computer vision to speech recognition and natural language processing due to their ability to achieve high accuracy. However, the high accuracy comes at the expense of significant computation cost. DNNs have extremely high computing demands as each inference can require hundreds of millions of MAC (multiply-accumulate) operations as well as a large amount of data to read and write. Therefore, techniques to improve efficiency of DNNs are needed.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4B illustrates example write transaction combinations performed by the WCB in FIG. 4A, in accordance with various embodiments.

FIG. 7 illustrates unequally sized tensors for a convolution run by multiple compute tiles, in accordance with various embodiments.

FIG. 11 is a flowchart showing a method of deep learning, in accordance with various embodiments.

DETAILED DESCRIPTION

Overview

Figure 1:
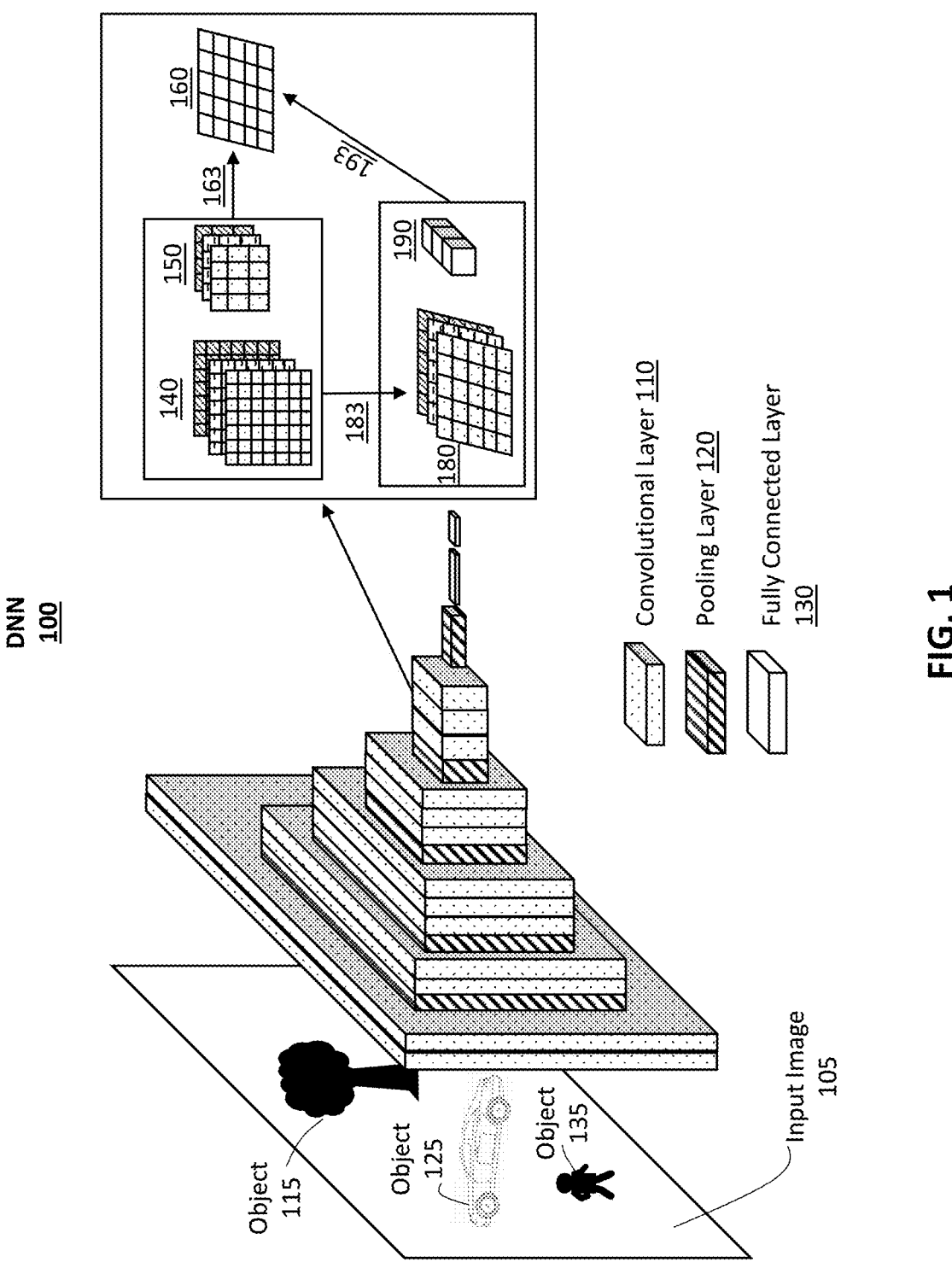
FIG. 1 illustrates an example DNN, in accordance with various embodiments.

The last decade has witnessed a rapid rise in AI (artificial intelligence) based data processing, particularly based on DNN. DNNs are widely used in the domains of computer vision, speech recognition, image, and video processing mainly due to their ability to achieve beyond human-level accuracy. The significant improvements in DNN model size and accuracy coupled with the rapid increase in computing power of execution platforms have led to the adoption of DNN applications even within resource constrained mobile and edge devices that have limited energy availability.

DNN applications are usually run on DNN accelerators. DNN accelerators, while executing DNN models, constantly read and write data from and to memory. The DNNs that are deployed onto the DNN accelerators are composed of different computational layers that can result in very compute and memory intensive tasks when mapped onto the DNN accelerators. However, performance of DNN accelerators is usually restrained by limited memory bandwidth. To maximize performance of DNN accelerators, it is important to alleviate the memory bandwidth bottleneck issue. However, memories in DNN applications are typically run at or close to maximum achievable speed, thus, leaving very little room for further improvement. Therefore, improved technology for improving performance of DNN accelerators is needed.

Embodiments of the present disclosure may improve on at least some of the challenges and issues described above by providing DNN accelerators with WCBs that can combine write transactions to reduce the number of write transactions. As the number of write transactions is reduced, the number of write activities at the memory and the number of memory accesses can also be reduced and therefore, the overall performance of the DNN accelerators can be improved despite limited memory bandwidth.

An example DNN accelerator includes a compute tile for performing a deep learning operation in a layer of a DNN. The deep learning operation may be convolution, pooling operation, elementwise operation, and so on. Taking convolution as an example, the compute tile may include an MAC array that runs a convolution on an input tensor and one or more filters to produce an output tensor. The compute tile may also include a WCB and a local memory. The WCB can write the output tensor into the memory through a series of write transactions. A write transaction includes a data block, which is a portion of the output tensor, and metadata indicating one or more attributes of the data block. For instance, the metadata may specify a memory address of the data block, bytes in the data block, whether the bytes in the data block are enabled, whether the data block is activation data or data in a sparsity bitmap, coordinates of the data block, whether the data block falls into one or more halo regions of the output tensor, and so on.

The WCB may use the metadata to determine whether two or more write transactions can be combined into one combined transaction. For instance, the WCB determines whether two write transactions are destinated for a same memory address. The WCB may also determine whether all bytes in a write transaction are enabled. A byte may be for at least a portion of a data point in the output tensor. An enabled byte is a byte to be written into the memory. In some embodiments (e.g., embodiments where two write transactions fall into halo regions), the WCB may also determine whether the two write transactions fall into the same halo regions. The WCB may further analyze characteristics of the halo region and coordinates of the data blocks of the write transactions to determine whether to combine the write transactions.

In various embodiments, the WCB may select not to combine a write transaction with any other write transactions. In an example, the WCB may determine that the write transaction is not combinable. In another example, the WCB may operate in a bypass mode in which the WCB does not combine write transactions. In yet another example, the WCB, while operating in a high throughput mode, may select to not combine certain write transactions. In yet another example, an internal memory of the WCB ("WCB memory") may store a write transaction when the WCB flushes the WCB memory. The flush can cause all write transactions in the WCB memory to be sent out from the WCB memory and written into the local memory of the compute tile without combination. The flush may also prevent any write transactions from being stored in the WCB memory.

The WCB in the present disclosure can facilitate write workloads of output tensors of various sizes. The WCB may combine smaller write transactions into one bigger write transaction to reduce memory bandwidth needed by write transactions. Thus, write transactions can progress faster and be less of an impediment to the overall system. Moreover, since write and read transactions compete for the same memory bandwidth, as the memory bandwidth for write transactions is reduced, read transactions may get a bigger slice of the memory bandwidth and advance at a higher rate. Since read transactions typically precede write transactions in the execution of a DNN accelerator, the overall performance of the DNN accelerator can be improved. Also, the reduction in the total number of write transactions can save power needed to run the local memory. The saved power can exceed the power consumed by combining the write transactions, so that the overall power consumption can be reduced.

Moreover, the WCB can be shared between a local pipeline through which the output tensor is written into the local memory of the local compute tile (i.e., the compute tile where the WCB is located) and a halo pipeline through which data in a halo region of the output tensor ("halo data") can be written into a local memory of a remote compute tile (i.e., a compute tile external to the local compute tile). The WCB can combine write transactions of halo data based on the transfer of halo data along the halo pipeline. For instance, the WCB may determine not to combine write transactions, despite that the write transaction are designated for the same memory location and have data blocks falling in the same halo region, based on a determination that the output tensor and a remote tensor to be used by a remote compute tile have different widths and that coordinates of the data blocks along the direction of the height of the output tensor are different.

Additionally, the WCB can operation in a high throughput mode where it can avoid the generation of stall cycles due to memory hazards. This can be advantageous as stalls may ripple through the entire compute tile and even affect other compute tiles in the DNN accelerator. With the high throughput mode, these stalls can be avoided at the expense of potentially more write transactions. The overall system performance may nonetheless be improved.

The WCB memory can also provide additional buffer space in the compute tile. The WCB memory can temporarily store write transactions and delay the issue of the write transactions to the local memory of the compute tile. This may be crucial for convolution workloads (such as workloads with short periods of high write activity) in which read and write accesses have to compete for the limited memory bandwidth. Without buffering, write transactions could interfere with read transactions that are trying to access the local memory at the same time, in which case the read accesses could be delayed. At times when read transactions require no or less memory bandwidth, the WCB can flush the WCB memory to send out the buffered write transactions. By spreading out write transactions over time, a more efficient use of the limited memory bandwidth can be achieved. A controlled release of write transactions is enabled so that memory contention can be reduced, and the overall system performance can be further improved.

For purposes of explanation, specific numbers, materials and configurations are set forth in order to provide a thorough understanding of the illustrative implementations. However, it will be apparent to one skilled in the art that the present disclosure may be practiced without the specific details or/and that the present disclosure may be practiced with only some of the described aspects. In other instances, well known features are omitted or simplified in order not to obscure the illustrative implementations.

Further, references are made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the following detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value based on the input operand of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the input operand of a particular value as described herein or as known in the art.

In addition, the terms "comprise," "comprising," "include," "including," "have," "having" or any other variation thereof, are intended to cover a non-exclusive inclusion. For example, a method, process, device, or DNN accelerator that comprises a list of elements is not necessarily limited to only those elements but may include other elements not expressly listed or inherent to such method, process, device, or DNN accelerators. Also, the term "or" refers to an inclusive "or" and not to an exclusive "or."

The DNN systems, methods and devices of this disclosure each have several innovative aspects, no single one of which is solely responsible for all desirable attributes disclosed herein. Details of one or more implementations of the subject matter described in this specification are set forth in the description below and the accompanying drawings.
Example DNN FIG. 1 illustrates an example DNN 100, in accordance with various embodiments. For purpose of illustration, the DNN 100 in FIG. 1 is a convolutional neural network (CNN). In other embodiments, the DNN 100 may be other types of DNNs. The DNN 100 is trained to receive images and output classifications of objects in the images. In the embodiments of FIG. 1, the DNN 100 receives an input image 105 that includes objects 115, 125, and 135. The DNN 100 includes a sequence of layers comprising a plurality of convolutional layers 110 (individually referred to as "convolutional layer 110"), a plurality of pooling layers 120 (individually referred to as "pooling layer 120"), and a plurality of fully connected layers 130 (individually referred to as "fully connected layer 130"). In other embodiments, the DNN 100 may include fewer, more, or different layers. In an inference of the DNN 100, the layers of the DNN 100 execute tensor computation that includes many tensor operations, such as convolution (e.g., multiply-accumulate (MAC) operations, etc.), pooling operations, elementwise operations (e.g., elementwise addition, elementwise multiplication, etc.), other types of tensor operations, or some combination thereof.

The convolutional layers 110 summarize the presence of features in the input image 105. The convolutional layers 110 function as feature extractors. The first layer of the DNN 100 is a convolutional layer 110. In an example, a convolutional layer 110 performs a convolution on an input tensor 140 (also referred to as input feature map (IFM) 140) and a filter 150. As shown in FIG. 1, the IFM 140 is represented by a 7×7×3 three-dimensional (3D) matrix. The IFM 140 includes 3 input channels, each of which is represented by a 7×7 two-dimensional (2D) matrix. The 7×7 2D matrix includes 7 input elements (also referred to as input points) in each row and 7 input elements in each column. The filter 150 is represented by a 3×3×3 3D matrix. The filter 150 includes 3 kernels, each of which may correspond to a different input channel of the IFM 140. A kernel is a 2D matrix of weights, where the weights are arranged in columns and rows. A kernel can be smaller than the IFM. In the embodiments of FIG. 1, each kernel is represented by a 3×3 2D matrix. The 3×3 kernel includes 3 weights in each row and 3 weights in each column. Weights can be initialized and updated by backpropagation using gradient descent. The magnitudes of the weights can indicate importance of the filter 150 in extracting features from the IFM 140.

The convolution includes MAC operations with the input elements in the IFM 140 and the weights in the filter 150. The convolution may be a standard convolution 163 or a depthwise convolution 183. In the standard convolution 163, the whole filter 150 slides across the IFM 140. All the input channels are combined to produce an output tensor 160 (also referred to as output feature map (OFM) 160). The OFM 160 is represented by a 5×5 2D matrix. The 5×5 2D matrix includes 5 output elements (also referred to as output points) in each row and 5 output elements in each column. For purpose of illustration, the standard convolution includes one filter in the embodiments of FIG. 1. In embodiments where there are multiple filters, the standard convolution may produce multiple output channels in the OFM 160.

The multiplication applied between a kernel-sized patch of the IFM 140 and a kernel may be a dot product. A dot product is the elementwise multiplication between the kernel-sized patch of the IFM 140 and the corresponding kernel, which is then summed, always resulting in a single value. Because it results in a single value, the operation is often referred to as the "scalar product." Using a kernel smaller than the IFM 140 is intentional as it allows the same kernel (set of weights) to be multiplied by the IFM 140 multiple times at different points on the IFM 140. Specifically, the kernel is applied systematically to each overlapping part or kernel-sized patch of the IFM 140, left to right, top to bottom. The result from multiplying the kernel with the IFM 140 one time is a single value. As the kernel is applied multiple times to the IFM 140, the multiplication result is a 2D matrix of output elements. As such, the 2D output matrix (i.e., the OFM 160) from the standard convolution 163 is referred to as an OFM.

In the depthwise convolution 183, the input channels are not combined. Rather, MAC operations are performed on an individual input channel and an individual kernel and produce an output channel. As shown in FIG. 1, the depthwise convolution 183 produces a depthwise output tensor 180. The depthwise output tensor 180 is represented by a 5×5×3 3D matrix. The depthwise output tensor 180 includes 3 output channels, each of which is represented by a 5×5 2D matrix. The 5×5 2D matrix includes 5 output elements in each row and 5 output elements in each column. Each output channel is a result of MAC operations of an input channel of the IFM 140 and a kernel of the filter 150. For instance, the first output channel (patterned with dots) is a result of MAC operations of the first input channel (patterned with dots) and the first kernel (patterned with dots), the second output channel (patterned with horizontal strips) is a result of MAC operations of the second input channel (patterned with horizontal strips) and the second kernel (patterned with horizontal strips), and the third output channel (patterned with diagonal stripes) is a result of MAC operations of the third input channel (patterned with diagonal stripes) and the third kernel (patterned with diagonal stripes). In such a depthwise convolution, the number of input channels equals the number of output channels, and each output channel corresponds to a different input channel. The input channels and output channels are referred to collectively as depthwise channels. After the depthwise convolution, a pointwise convolution 193 is then performed on the depthwise output tensor 180 and a 1×1×3 tensor 190 to produce the OFM 160.

The OFM 160 is then passed to the next layer in the sequence. In some embodiments, the OFM 160 is passed through an activation function. An example activation function is the rectified linear activation function (ReLU). ReLU is a calculation that returns the value provided as input directly, or the value zero if the input is zero or less. The convolutional layer 110 may receive several images as input and calculate the convolution of each of them with each of the kernels. This process can be repeated several times. For instance, the OFM 160 is passed to the subsequent convolutional layer 110 (i.e., the convolutional layer 110 following the convolutional layer 110 generating the OFM 160 in the sequence). The subsequent convolutional layers 110 performs a convolution on the OFM 160 with new kernels and generates a new feature map. The new feature map may also be normalized and resized. The new feature map can be kernelled again by a further subsequent convolutional layer 110, and so on.

In some embodiments, a convolutional layer 110 has 4 hyperparameters: the number of kernels, the size F kernels (e.g., a kernel is of dimensions F×F×D pixels), the S step with which the window corresponding to the kernel is dragged on the image (e.g., a step of one means moving the window one pixel at a time), and the zero-padding P (e.g., adding a black contour of P pixels thickness to the input image of the convolutional layer 110). The convolutional layers 110 may perform various types of convolutions, such as 2-dimensional convolution, dilated or atrous convolution, spatial separable convolution, depthwise separable convolution, transposed convolution, and so on. The DNN 100 includes 16 convolutional layers 110. In other embodiments, the DNN 100 may include a different number of convolutional layers.

The pooling layers 120 down-sample feature maps generated by the convolutional layers, e.g., by summarizing the presence of features in the patches of the feature maps. A pooling layer 120 is placed between 2 convolution layers 110: a preceding convolutional layer 110 (the convolution layer 110 preceding the pooling layer 120 in the sequence of layers) and a subsequent convolutional layer 110 (the convolution layer 110 subsequent to the pooling layer 120 in the sequence of layers). In some embodiments, a pooling layer 120 is added after a convolutional layer 110, e.g., after an activation function (e.g., ReLU) has been applied to the OFM 160.

A pooling layer 120 receives feature maps generated by the preceding convolution layer 110 and applies a pooling operation to the feature maps. The pooling operation reduces the size of the feature maps while preserving their important characteristics. Accordingly, the pooling operation improves the efficiency of the DNN and avoids over-learning. The pooling layers 120 may perform the pooling operation through average pooling (calculating the average value for each patch on the feature map), max pooling (calculating the maximum value for each patch of the feature map), or a combination of both. The size of the pooling operation is smaller than the size of the feature maps. In various embodiments, the pooling operation is 2×2 pixels applied with a stride of 2 pixels, so that the pooling operation reduces the size of a feature map by a factor of 2, e.g., the number of pixels or values in the feature map is reduced to one quarter the size. In an example, a pooling layer 120 applied to a feature map of 6×6 results in an output pooled feature map of 3×3. The output of the pooling layer 120 is inputted into the subsequent convolution layer 110 for further feature extraction. In some embodiments, the pooling layer 120 operates upon each feature map separately to create a new set of the same number of pooled feature maps.

The fully connected layers 130 are the last layers of the DNN. The fully connected layers 130 may be convolutional or not. The fully connected layers 130 receive an input operand. The input operand defines the output of the convolutional layers 110 and pooling layers 120 and includes the values of the last feature map generated by the last pooling layer 120 in the sequence. The fully connected layers 130 apply a linear combination and an activation function to the input operand and generate an individual partial sum. The individual partial sum may contain as many elements as there are classes: element i represents the probability that the image belongs to class i. Each element is therefore between 0 and 1, and the sum of all is worth one. These probabilities are calculated by the last fully connected layer 130 by using a logistic function (binary classification) or a softmax function (multi-class classification) as an activation function.

In some embodiments, the fully connected layers 130 classify the input image 105 and return an operand of size N, where N is the number of classes in the image classification problem. In the embodiments of FIG. 1, N equals 3, as there are 3 objects 115, 125, and 135 in the input image. Each element of the operand indicates the probability for the input image 105 to belong to a class. To calculate the probabilities, the fully connected layers 130 multiply each input element by weight, make the sum, and then apply an activation function (e.g., logistic if N=2, softmax if N>2). This is equivalent to multiplying the input operand by the matrix containing the weights. In an example, the individual partial sum includes 3 probabilities: a first probability indicating the object 115 being a tree, a second probability indicating the object 125 being a car, and a third probability indicating the object 135 being a person. In other embodiments where the input image 105 includes different objects or a different number of objects, the individual partial sum can be different.

Example Convolution

Figure 2:
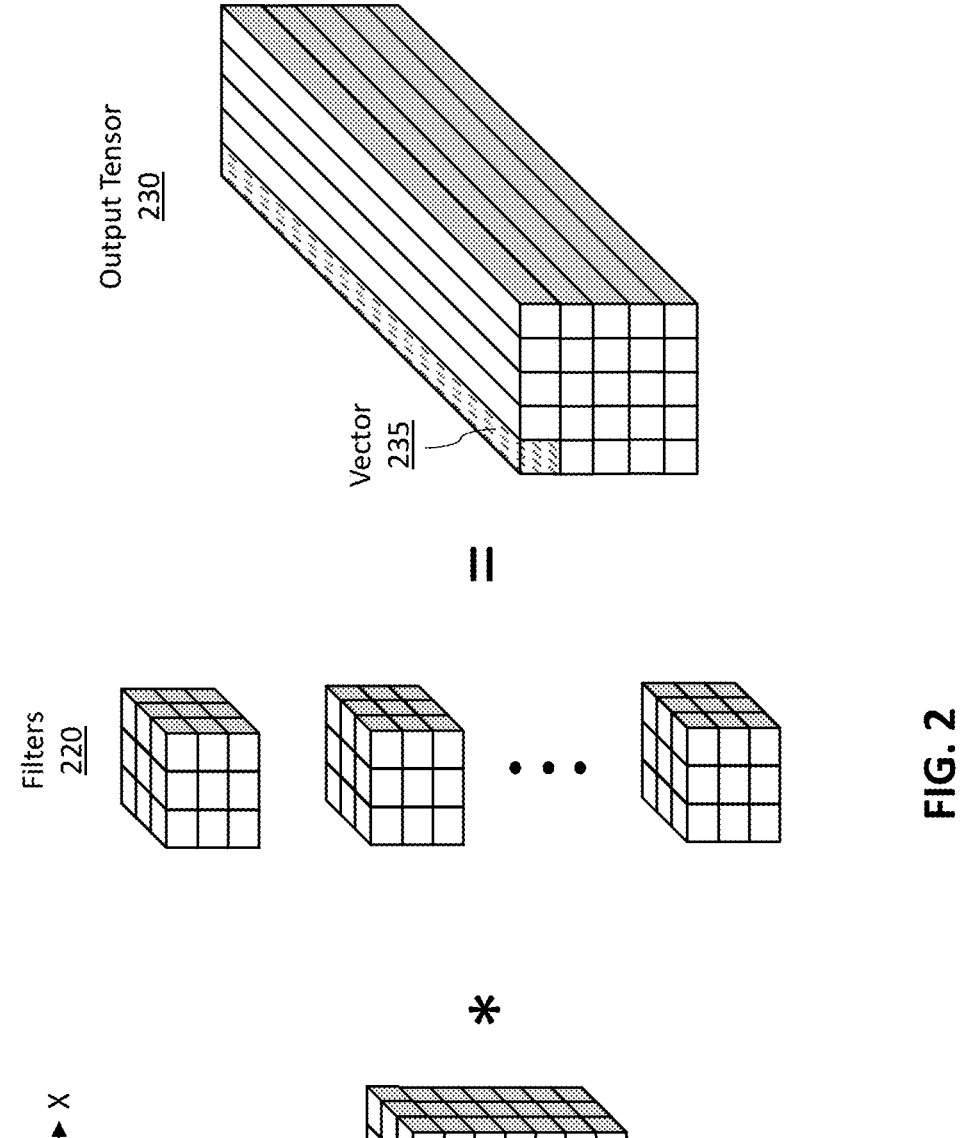
FIG. 2 illustrates an example convolution, in accordance with various embodiments.

FIG. 2 illustrates an example convolution, in accordance with various embodiments. The convolution may be a convolution in a convolutional layer of a DNN, e.g., a convolutional layer 110 in FIG. 1. The convolution can be executed on an input tensor 210 and filters 220 (individually referred to as "filter 220"). A result of the convolution is an output tensor 230. In some embodiments, the convolution is performed by a compute tile, such as the compute tile 300 in FIG. 3. The output tensor may be written into a local memory of the compute tile by a WCB, such as the WCB 320 in FIG. 3.

In the embodiments of FIG. 2, the input tensor 210 includes input elements (also referred to as "input activations") arranged in a 3D matrix. An input element is a data point in the input tensor 210. The input tensor 210 has a spatial size $H_{in} \times W_{in} \times C_{in}$, where $H_{in}$ is the height of the 3D matrix (i.e., the length along the Y axis, which indicates the number of input activations in a column in the 2D matrix of each input channel), $W_{in}$ is the width of the 3D matrix (i.e., the length along the X-axis, which indicates the number of input activations in a row in the 2D matrix of each input channel), and $C_{in}$ is the depth of the 3D matrix (i.e., the length along the Z-axis, which indicates the number of input channels). For purpose of simplicity and illustration, the input tensor 210 has a spatial size of 7×7×3, i.e., the input tensor 210 includes three input channels and each input channel has a 7×7 2D matrix. Each input element in the input tensor 210 may be represented by a (X, Y, Z) coordinate.

Each filter 220 includes weights arranged in a 3D matrix. The values of the weights may be determined through training the DNN. A filter 220 has a spatial size $H_f \times W_f \times C_f$, where $H_f$ is the height of the filter (i.e., the length along the Y axis, which indicates the number of weight in a column in each kernel), $W_f$ is the width of the filter (i.e., the length along the X-axis, which indicates the number of weights in a row in each kernel), and $C_f$ is the depth of the filter (i.e., the length along the Z-axis, which indicates the number of channels). In some embodiments, $C_f$ equals $C_{in}$. For purpose of simplicity and illustration, each filter 220 in FIG. 2 has a spatial size of 3×3×3, i.e., the filter 220 includes 3 convolutional kernels with a spatial size of 3×3. The spatial size of the convolutional kernels is smaller than the spatial size of the 2D matrix of each input channel in the input tensor 210.

In the convolution, each filter 220 slides across the input tensor 210 and generates a 2D matrix for an output channel in the output tensor 230. In the embodiments of FIG. 2, the 2D matrix has a spatial size of 5×5. The output tensor 230 includes output elements (also referred to as "output activations") arranged in a 3D matrix. An input element is a data point in the output tensor 230. An input element may take one or more bytes in a memory. The number of bytes for an input element may depend on the data format. For example, when the input element has a INT8 format, the input element takes one byte. When the input element has a FP16 format, the input element takes two bytes. Other data formats may be used for output elements. The output tensor 230 has a spatial size $H_{out} \times W_{out} \times C_{out}$, where $H_{out}$ is the height of the 3D matrix (i.e., the length along the Y axis, which indicates the number of output activations in a column in the 2D matrix of each output channel), $W_{out}$ is the width of the 3D matrix (i.e., the length along the X-axis, which indicates the number of output activations in a row in the 2D matrix of each output channel), and $C_{out}$ is the depth of the 3D matrix (i.e., the length along the Z-axis, which indicates the number of output channels). $C_{out}$ may equal the number of filters 220 in the convolution. $H_{out}$ and $W_{out}$ may depend on the heights and weights of the input tensor 210 and each filter 220.

As a part of the convolution, MAC operations can be performed on a 3×3×3 subtensor 215 (which is highlighted with a dotted pattern in FIG. 2) in the input tensor and each filter 220. The result of the MAC operations on the subtensor 215 and one filter 220 is a data point in the output tensor 230, which is also referred to as an element or an output element in the output tensor 230. In some embodiments (e.g., embodiments where the convolution is an integral convolution), an output element may include 8 bits, e.g., one byte. In other embodiments (e.g., embodiments where the convolution is a floating-point convolution), an output element may include more than one byte. For instance, an output element may include two bytes.

After the MAC operations on the subtensor 215 and all the filters 220 are finished, a vector 235 is produced. The vector 235 is highlighted with slashes in FIG. 2. The vector 235 includes a sequence of output elements, which are arranged along the Z-axis. The output elements in the vector 235 have the same (X, Y) coordinate, but the output elements correspond to different output channels and have different Z coordinates. The dimension of the vector 235 along the Z-axis may equal the total number of output channels in the output tensor 230. After the vector 235 is produced, further MAC operations are performed to produce additional vectors till the output tensor 230 is produced.

In the process of producing the output tensor 230, a plurality of write transactions are formed for writing the output elements in the output tensor into the local memory of the compute tile. A write transaction includes a data block and metadata associated with the data block. The data block is a portion of the output tensor 230 and is to be written into the memory 340. The data block may be a sequence of output elements in the output tensor. The output elements in the data block may have the same (X, Y) coordinate but different Z coordinates. An example of the data block is the vector 235 or a portion of the vector 235. In some embodiments, the data blocks in the write transactions may have a fixed storage size, e.g., 16 bytes.

In some embodiments, write transactions may have a fixed number of bytes, e.g., 32 bytes. A data block may use a subset (as opposed to all) of the bytes in a write transaction. Also, one or more bytes in the data block may not need to be written into the memory. For instance, these bytes may be for data points that will not be used in the convolution, e.g., for the reason that these data points correspond to zero-valued weights or for other reasons. A byte that will not be written into the memory may be referred to as an unenabled byte. In contrast, a byte that will be written into the memory is referred to as an enabled byte. Given that not all bytes in the written transaction are taken by the data block or that not all bytes in the data block are enabled, the write transaction may have bytes for another data block and can be combined with another write transaction.

The metadata in a write transaction provides information of one or more attributes of the data block, e.g., information to be used for determining how to write the data block. The metadata may be used to determine a location for storing the write transaction in a WCB memory. The metadata may also be used to determine whether to combine the write transaction with another write transaction. In some embodiments, the metadata includes data specifying a memory address where the data block is to be written, bytes in the data block, which bytes are enabled, (X, Y) coordinates of the data block, one or more halo regions that the data block falls into, and so on. In some embodiments, the metadata includes an enablement value for each byte in the transaction. The enablement value may be 1, which indicates that the corresponding byte is enabled, or 0, which indicates that the corresponding byte is not enabled.

The metadata may also include information indicating whether the data block is data in a sparsity bitmap (also referred to as "bitmap") or data in an output tensor. A data block associated with a sparsity bitmap may have been compressed by reducing sparsity, e.g., by removing one or more output elements having zero values. The bitmap includes a plurality of bitmap elements, each of which may correspond to a different output element in the data block. A value of a bitmap element is determined based at least on a value of the corresponding output element. For instance, for each output element having a non-zero value, the corresponding bitmap element has a value of one. For each output element having a zero value, the corresponding bitmap element has a value of zero. A position of a bitmap element in the bitmap may match the position of the corresponding output element in the data block before compression.

Example Compute Tile

Figure 3:
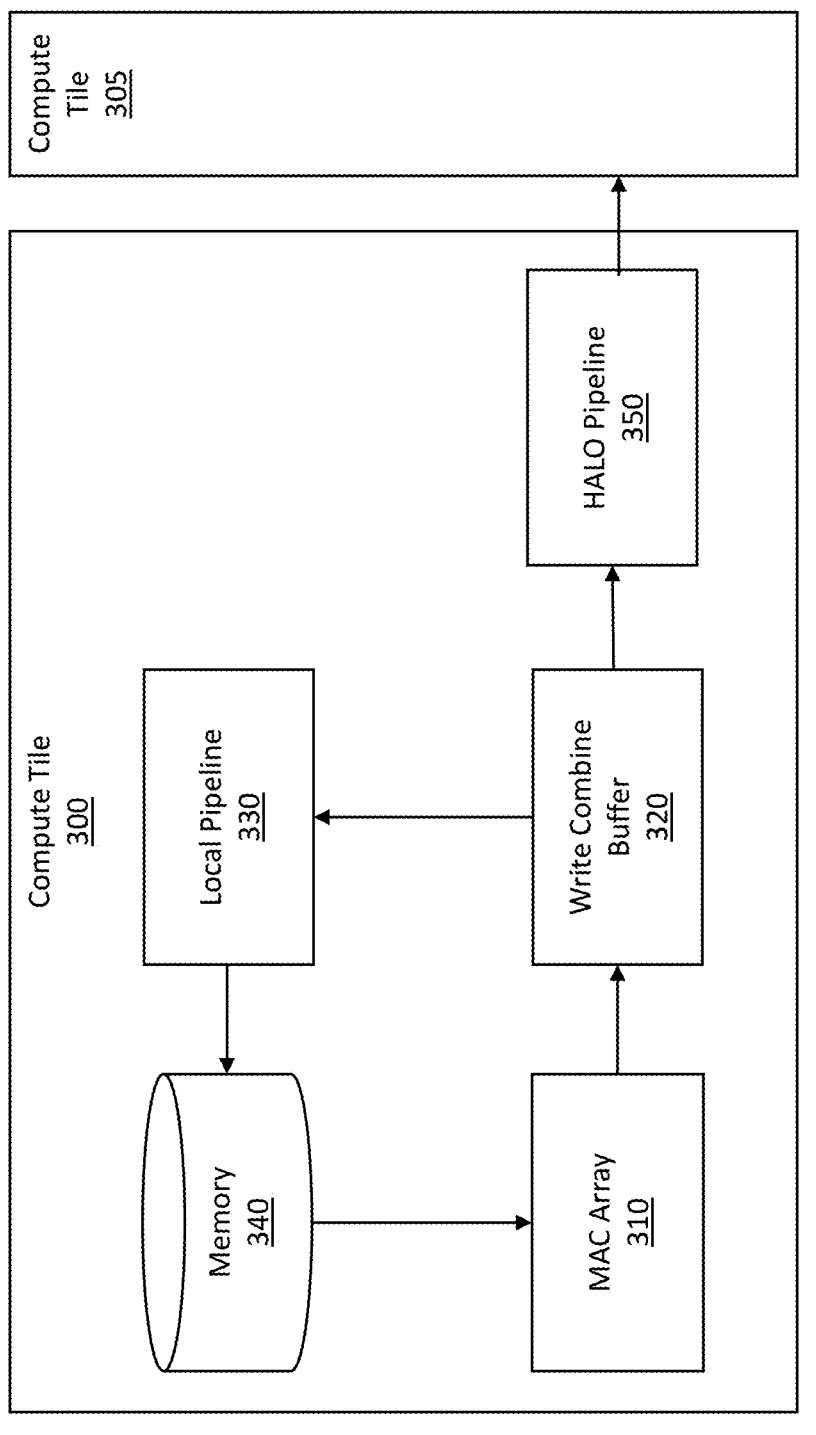
FIG. 3 is a block diagram of a compute tile, in accordance with various embodiments.

FIG. 3 is a block diagram of a compute tile 300, in accordance with various embodiments. The compute tile 300 performs computation for deep learning operations, such as convolutional operation ("convolution"), pooling operation, elementwise operation, and so on. The compute tile 300 may run a DNN layer, or a portion of the DNN layer.

The compute tile 300 in FIG. 3 includes an MAC array 310, a WCB 320, a local pipeline 330, a memory 340, and a halo pipeline 350. In other embodiments, alternative configurations, different or additional components may be included in the compute tile 300. Further, functionality attributed to a component of the compute tile 300 may be accomplished by a different component included in the compute tile 300 or by a different system.

The MAC array 310 includes MAC units arranged in columns, or columns and rows. Each MAC unit can perform MAC operations. In some embodiments, a MAC unit includes a multiply unit for performing multiplications. An MAC unit may also include an accumulate unit for performing accumulations. A column of MAC units is referred to as an MAC column. An MAC column may be associated with one or more MAC lanes. A MAC lane is a path for loading data into a MAC column. A MAC lane may be also referred to as a data transmission lane or data loading lane. A MAC column may have multiple MAC lanes. The loading bandwidth of the MAC column is an aggregation of the loading bandwidths of all the MAC lanes associated with the MAC column. With a certain number of MAC lanes, data can be fed into the same number of independent MAC units simultaneously. In some embodiments where a MAC column has four MAC lanes for feeding activations or weights into the MAC column and each MAC lane may have a bandwidth of 16 bytes, the four MAC lanes can have a total loading bandwidth of 64 bytes.

Through the MAC lanes, each of at least a subset of the MAC units in the MAC array 310 may receive two signals: an input operand and a weight operand. The input operand may be a portion of an input tensor of a convolution, and the weight operand may be a portion of a filter of the convolution. In some embodiments, the input operand includes a vector in the input tensor, the vector may be a sequence of input elements having the same (X, Y) coordinates but different Z coordinate. The weight operand includes a vector including a sequence of weights having the same (X, Y) coordinates but different Z coordinate. The MAC unit may generate an output signal, which may be referred to as an output operand. The output operand may be a sequence of output elements having the same (X, Y) coordinates but different Z coordinate. The output operand may constitute a data block in a write transaction.

The WCB 320 receives an output tensor from the MAC array 310 and writes the output tensor into the memory 340 through a series of write transactions. The WCB 320 may receive different write transactions at different times. In some embodiments, the WCB 320 includes an internal memory (i.e., WCB memory) for temporarily storing write transactions so that the WCB 320 can control when to process the write transactions. The WCB 320 may map write transactions to locations in the WCB memory, e.g., by using a memory location mapping function. In some embodiments, the WCB 320 may combine a write transaction with another write transaction that enters the WCB 320 at a later time. In other embodiments, the WCB 320 may conduct a timed flush of the internal memory so that the write transactions stored in the internal memory can be sent out from the WCB 320 to the memory 340 at a time determined by the WCB 320.

The WCB 320 may operate in a combining mode or bypass mode. In the combining mode, the WCB 320 may combine write transactions in the workload of writing the output tensor to reduce the total number of write transactions in the workload. For instance, the WCB 320 may combine a first write transaction in the workload with a second write transaction in the workload to form a combined write transaction. The WCB 320 may send the combined write transaction to the memory 320 through the local pipeline 330. Alternatively, the WCB 320 may store the combined write transaction in the WCB memory and further combine the combined write transaction with a third write transaction. By reducing the number of write transaction, the number of memory accesses can be reduced, and the efficiency of the compute tile 300 can be improved. While operating in the combining mode, the WCB 320 may determine not to combine any write transaction, e.g., based on a determination that one or more conditions for combining are not met.

In the bypass mode, the WCB 320 may write the output tensor without combining any of the write transactions in the workload, so the total number of write transaction does not reduce. The WCB 320 may choose not to buffer the write transactions in the bypass mode, so that the time and computation resources needed for buffering and combining write transactions can be saved.

In some embodiments, the WCB 320 may flush the WCB memory and send out write transactions stored in the WCB memory without combining them with other write transactions. These write transactions can be written into the memory 340 separately. Certain aspects of the WCB 320 are described below in conjunction with FIG. 4A.

The local pipeline 330 provide a data transmission path for the WCB 320 to write data into the memory 340. An output tensor of a convolutional layer run by the MAC array 310 may be written into the memory 340 through the local pipeline 330.

The memory 340 is local to the compute tile 300. In the embodiments of FIG. 3, the memory 340 is inside the compute tile 300. In other embodiments, the memory 340 may be outside the compute tile 300. The memory 340 and the compute tile 300 can be implemented on the same chip. The memory 340 stores data used for or generated from convolutions, e.g., input tensors, kernels, and output tensors. In some embodiments, the memory 340 includes one or more SRAMs (static random-access memories). The memory 340 may be register files. Some of the register files may be designated for input activations, weights, or output activations. In some embodiments, the memory 340 may also include one or more cache memories.

Figure 9:
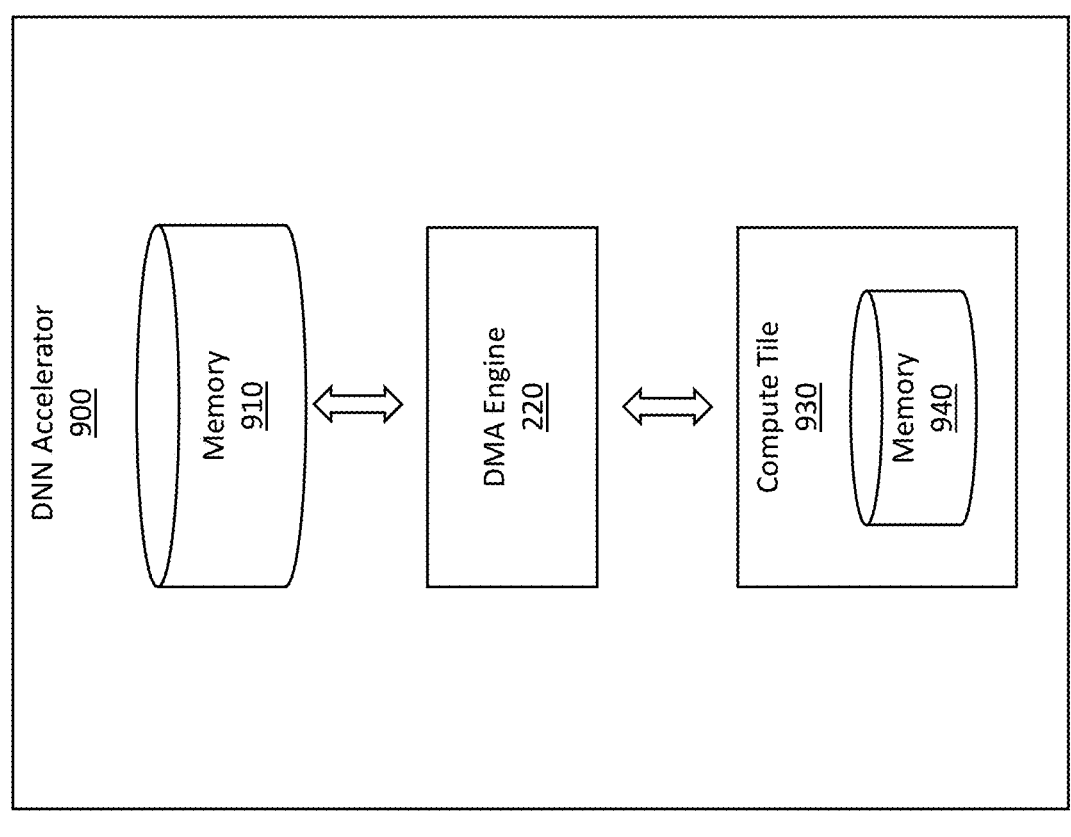
FIG. 9 is a block diagram of a DNN accelerator, in accordance with various embodiments.

An input tensor or kernel may be written into the memory 340 by a DMA (direct memory access) engine (e.g., the DMA engine 920 in FIG. 9). An output tensor may be written into the memory 340 by the WCB 320 through the local pipeline 330. The output tensor may be used as the input tensor of the next convolutional layer, at least a portion of which can be run by the MAC array 310. In embodiments where the MAC array 310 runs a portion of the next convolutional layer, one or more portions of the output tensor (e.g., one or more halo regions) may be transmitted to one or more other compute tiles through the halo pipeline 350. Data can be written to various addresses in the memory 340. In some embodiments, an address in the memory 340 corresponds to a fixed number of bytes. The fixed number, in an example, may be 32.

The halo pipeline 350 provides a data transmission path for the WCB 320 to write data in halo regions into a local memory of a compute tile 305. The compute tile 305 may include similar components as the compute tile 300. The memory 340 may store a local tensor that is the output tensor of a first convolution that has been run by the MAC array 310. The local tensor may also be an input tensor of a second convolution to be run by the MAC array 310 and an MAC array in the compute tile 305. The two MAC arrays may run in parallel to finish the second convolution. In some embodiments, the workload of the second convolution is split into the two MAC arrays. The compute tile 305 is a remote compute tile and may perform MAC operations on a remote tensor that is stored in the local memory of the compute tile 305. The remote tensor is a tensor that is remote to the compute tile 300 as it is stored in the local memory of a different compute tile. Even though FIG. 3 shows two compute tiles 300 and 305, there can be more compute tiles in the DNN accelerator in other embodiments. The compute tiles in a DNN accelerator may communicate with each other through a network-on-chip.

The halo region is replicated from the local tensor to the remote tensor for facilitating the partition of the workload of the second convolution. Activation data in the halo region, which is referred to as "halo data," may be transferred from the WCB 320 to the local memory of the compute tile 305 through the halo pipeline 350. For a write transaction of halo data, the WCB 320 may conduct further analysis to determine whether to combine it with another write transaction. FIG. 3 shows one halo pipeline 350. Halo data may be transferred to multiple remote compute tiles through the halo pipeline 350. The halo pipeline 350 may be coupled to a network-on-chip, which is coupled to compute tiles (e.g., the compute tiles 300 and 305, etc.) and facilitate communications between the compute tiles. In other embodiments, the compute tile 300 may include multiple halo pipelines 350, each for a different one of the other compute tiles.

Example WCB

Figure 4A:
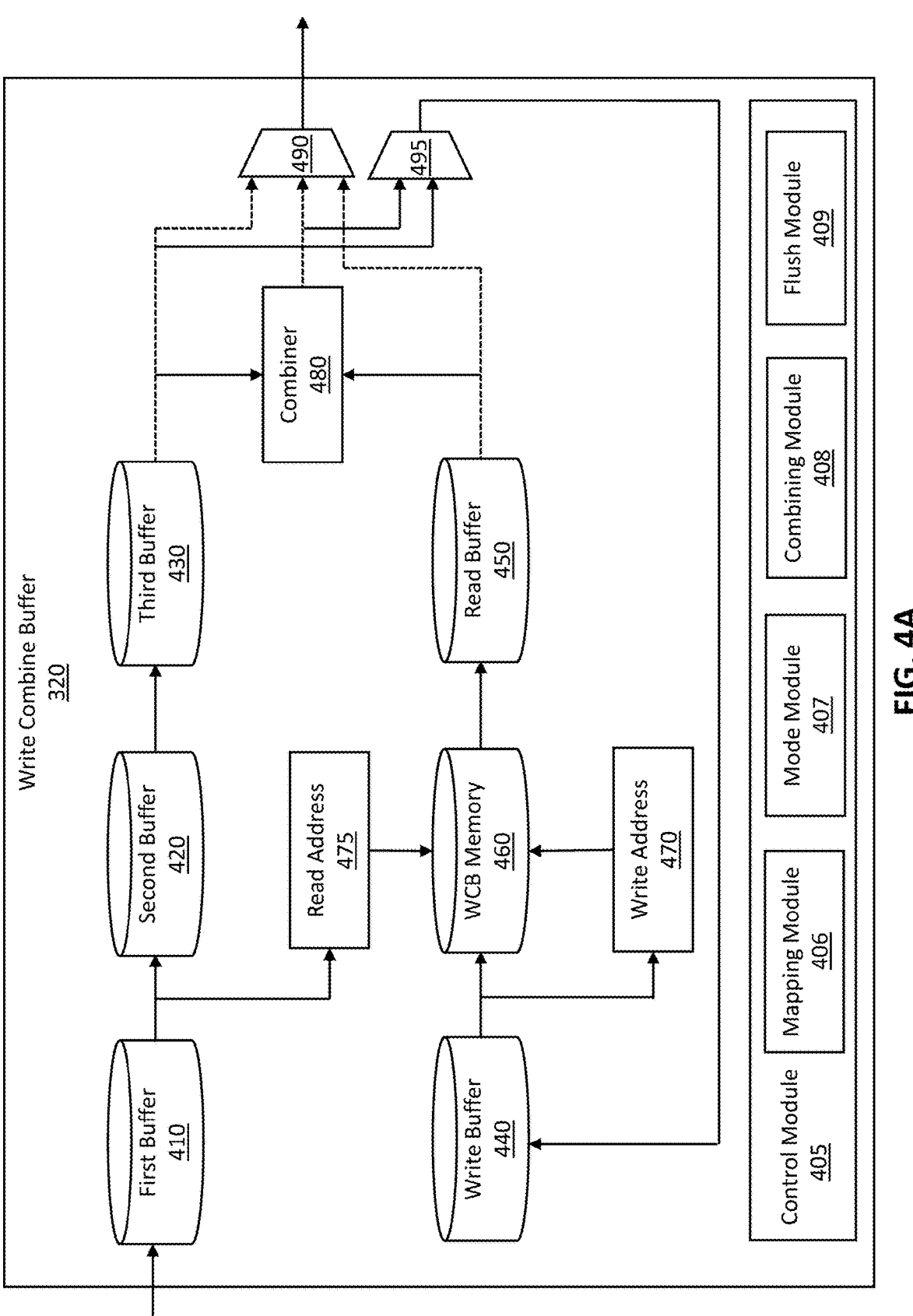
FIG. 4A is a block diagram of a WCB, in accordance with various embodiments.

FIG. 4A is a block diagram of the WCB 320, in accordance with various embodiments. As described above, the WCB 320 receives write transactions and processes the write transaction to write an output tensor into the memory 340. The WCB 320 includes a control module 405, a first buffer 410, a second buffer 420, a third buffer 430, a write buffer 440, a read buffer 450, a WCB memory 460, a combiner 480, and multiplexers (MUX) 490 and 495. Some or all of the first buffer 410, second buffer 420, third buffer 430, write buffer 440, and read buffer 450 may be collectively referred to as buffers. In other embodiments, alternative configurations, different or additional components may be included in the WCB 320. Further, functionality attributed to a component of the WCB 320 may be accomplished by a different component included in the WCB 320 or by a different system.

The buffers 410, 420, 430, and 440 temporarily store write transactions before the write transactions are written into the WCB memory 460. Initially, the WCB memory 460 may be empty, i.e., no data is stored in the WCB memory 460. As a first write transaction enters the WCB 320, it may traverse the buffers 410, 420, 430, and 440, then gets written into the WCB memory 460, e.g., through the MUX 495. The first write transaction can be stored at a location, i.e., write address 470, in the WCB memory 460. As a second memory transaction enters the WCB 320, the second write transaction may be written into the WCB memory 460 at the same location. The first write transaction would be retrieved from the location, i.e., read address 475, in the WCB memory 460 and be transferred to the read buffer 450. In some embodiments, the first write transaction are stored in the read buffer 450 while the second write transaction is stored in the third buffer 430. The two write transactions can be transferred from the two buffers 450 and 430 and fed into the combiner 480.

The combiner 480 includes a digital circuit that can combine write transactions. After the combiner 480 receives the two write transactions from the buffers 450 and 430, the combiner 480 may combine the two write transactions into one combined write transaction. The combined write transaction may be stored into the WCB memory 460. In some embodiments, the combined write transaction may be further combined with another write transaction. In other embodiments, the combined write transaction may be transmitted to the MUX 490 from the WCB memory 460 or from the combiner 480 and further be sent out from the WCB 320. For instance, the combined write transaction may enter the local pipeline 330 or halo pipeline 350 and further be written into a local memory, such as the memory 340 or a local memory of another compute tile. In embodiments where the first write transaction and the second write transaction are not combined, one or both of the two write transactions may be sent out from the WCB 320 through the MUX 490.

The control module 405 controls some or all of the other components of the WCB 320. The control module 405 may manage the process of writing an output tensor into the memory 340. In FIG. 4A, the control module 405 includes a mapping module 406, a mode module 407, a combining module 408, and a flush module 409. In other embodiments, alternative configurations, different or additional components may be included in the control module 405. Further, functionality attributed to a component of the control module 405 may be accomplished by a different component included in the control module 405, a component included in the WCB 320, or by a different system.

The mapping module maps write transactions into locations in the WCB memory 460, i.e., locations where the write transactions will be stored in the WCB memory 460. The mapping module 406 may map two to-be-combined write transactions to the same location in the WCB memory 460. Also, the write transactions in the workload of writing an output tensor can be spread out across the memory so that all the available space can be used as best as possible. The mapping module 406 may determine the memory location where a write transaction is stored in the WCB memory 460 based on metadata in the write transaction, e.g., metadata that indicates whether the data block in the write transaction is data in a sparsity bitmap or activation data, metadata indicating memory address to which the data block is written, X coordinate of the data block, Y coordinate of the data block, other metadata, or some combination thereof.

Sparsity bitmaps and activation data may be both stored in the WCB memory 460. For instance, a part of the WCB memory 460 stores sparsity bitmap, and another portion of the WCB memory 460 stores activation data. The most-significant address bit in the write address 470 or read address 475 of a write transaction may be the metadata indicating whether the write transaction carries sparsity map or activation data. The mapping module 406 may determine the least-significant bits of the write address 470 or read address 475.

In some embodiments, the mapping module 406 selects a memory location mapping mode and uses the memory location mapping mode to map write transactions. The mapping module 406 may select the memory location mapping mode based on various factors, such as data type (e.g., whether sparsity bitmap data or activation data, etc.), output tensor size (e.g., output tensor depth, etc.), stencil size, sparsity level, other factors, or some combination thereof. In some embodiments, the mapping module 406 may independently select memory location mapping mode for sparsity data and activation data, so that the memory location mapping mode selected for sparsity data may be different from the one selected for activation data. The activation and sparsity may be combined using different memory location mapping modes.

In an example memory location mapping mode, the mapping module 406 determines a memory location of a write transaction based on (X, Y) coordinates of the data block in the write transaction and the spatial size of a stencil in the output tensor. A stencil is a unit tensor in the output tensor and may have a depth that spans across the entire depth (i.e., all the output channels) of the output tensor. The output tensor includes a sequence of stencils. In the convolution, all the output elements in the first stencil are computed before any output elements in the second stencil are computed. As the output elements for a stencil are computed, write transaction are produced. The spatial size of a stencil is determined by a width (i.e., a dimension along the X-axis), a height (i.e., a dimension along the Y axis), and a depth (i.e., a dimension along the Z-axis) of the stencil. In some embodiments, the depth of the stencil equals the numbers of the output channels. In some embodiments, the mapping module 406 may determine the memory location of the write transaction based on the following algorithm:

$$\text{MEM\_LOC} = (\text{COORDINATE\_}X \bmod \text{STENCIL\_WIDTH}) * \text{STENCIL\_HEIGHT} + (\text{COORDINATE\_}Y \bmod \text{STENCIL\_HEIGHT})$$

where MEM_LOC is the memory location, COORDINATE_X is the X coordinate of the data block, COORDINATE_Y is the Y coordinate of the data block, STENCIL_WIDTH is the width of the stencil that includes the data block, STENCIL_HEIGHT is the height of the stencil, and MOD is Modulo, i.e., the operation of finding the remainder when a number is divided by another number.

In this memory location mapping mode, data blocks having the same (X, Y) coordinates are mapped to the same memory location. This memory location mapping mode can be very beneficial for output tensors that are relatively deep, i.e., have a relatively high number of output channels. Data blocks that belong to the same (X, Y) coordinate may be stored contiguously in memory, and the corresponding write transactions can be combinable. The efficiency of the WCB 320 can be increased by mapping multiple write transactions (e.g., write transactions that can be combined) to the same internal memory location. In embodiments where an output element has more bytes, the number of write transactions for a specific (X, Y) coordinate increases, and thus the efficiency of the WCB 320 can increase.

In another example memory location mapping mode, the mapping module 406 may use a function to determine memory locations of write transactions. For instance, the mapping module 406 may enter the metadata indicating the memory address of a write transaction into the function, and the function outputs the memory location of the write transaction. Different from the previously described memory location mapping mode, in this memory location mapping mode, it is possible to map write transactions having different (X, Y) coordinates to the same memory location. This can be beneficial for output tensors that are relatively shallow, i.e., having a relatively low number of output channels. In a shallow output tensor, data for horizontally adjacent (X, Y) coordinates may be more likely destined for the same address in memory in the used storage modes, and thus, if combining is enabled for these write transactions, a higher efficiency of the WCB 320 can be achieved.

The mode module 407 determines one or more operation modes of the WCB 320 for a workload of writing an output tensor. The operation mode may be a bypass mode or a combining mode. In some embodiments, the mode module 407 receives an instruction that specifies an operation mode of the WCB 320 and uses the instruction to determine the operation mode of the WCB 320. The mode module 407 may receive the instruction from a compiler associated with the compute tile 300. The instruction may be included in a workload image generated by the compiler.

In other embodiments, the mode module 407 may select an operation mode of the WCB 320. For instance, the mode module 407 may evaluate the cost and benefit of combining write transactions and select the operation mode based on the evaluation. The cost of combining write transactions may include the extra time and computation resource (e.g., memory space, power, etc.) needed for combining write transactions. The benefit may include the reduction in memory accesses due to the reduction in the total number of write transactions. In embodiments where the mode module 407 determines that the benefit outweighs the cost, the mode module 407 may select the combining mode. In embodiments where the mode module 407 determines that the cost outweighs the benefit, the mode module 407 may select the bypass mode. To evaluate the cost and benefit, the mode module 407 may analyze various factors, e.g., the number of write transactions in the workload of writing the output tensor, spatial size of the output tensor, time limit on finishing the workload, available resources for combining write transactions, other factors, or some combination thereof.

In embodiments where the mode module 407 selects the bypass mode, the control module 405 prevents combination of any write transactions, i.e., write transactions pass through the WCB 320 without being combined. For instance, a write transaction may traverse the buffers 410, 420, and 430, then exit the WCB 320 through the MUX 490. The write transaction can be transferred to the designated address in the memory 340 through the local pipeline 330. The bypass mode would not reduce the total number of write transactions for writing an output tensor into the memory 340 but may reduce delay caused by combining write transactions.

In some embodiments, the mode module 407 may select the bypass mode for an output tensor where little or no transaction combining is possible. For instance, the mode module 407 may determine the number of write transactions in the workload of writing the output sensor, e.g., based on the spatial size of the output tensor. In an embodiment, the mode module 407 may select the bypass mode based on a determination that the number of write transactions in the workload is lower than a threshold. In another embodiment, the mode module 407 may select to use the combining mode based on a determination that the number of write transactions in the workload is equal to or higher than the threshold.

In other embodiments, the mode module 407 may use other factors to select operation mode. For instance, the mode module 407 may select an operation mode based on a time limit on the workload. The mode module 407 may select the bypass mode based on a determination that if write transactions are combined, the time consumed by the workload would exceed the time limit, due to the extra time needed for buffering and combining write transactions. The mode module 407 selects the bypass mode to minimize the time to complete the write of the output tensor with the expense of potentially more write transactions to the memory 340. The bypass mode also acts as a fallback mechanism in the case of implementation issues in the WCB core logic. Lastly, the existence of the bypass mode enables the simple evaluation of the effectiveness of the WCB as network executions can be repeated and the effect of the write combine buffer taken out of the equation with this switch. Transaction counters in the neural compute engine allow the easy comparison of performance.

In embodiments where the mode module 407 selects the combining mode, the mode module 407 may also determine whether to enable a high throughput mode to address memory hazards in the WCB 320. A memory hazard may occur, e.g., when a write transaction buffered inside the first buffer 410 may affect a read from the WCB memory 460, but there may be write transactions further down the pipeline (e.g., write transactions in the buffer 420, 430, or 440) that need to be written to the same address in the memory 340. The write transaction in the first buffer 410 may be stalled to solve the problem, which can cause a delay in the workload and the delay can ripple through the entire compute tile 300 (or even to other compute tiles in the DNN accelerator) and degrade the performance of the DNN accelerator. In such cases, the mode module 407 may enable the high throughput mode, which prevents combination of write transactions when stall occurs, to avoid the delay by not stalling any write transactions in the first buffer 410. The high throughput mode may also prevent memory read from being performed in some embodiments. As no memory read is performed, no data can be potentially combined with a write transaction in the WCB memory 460 and the write transaction can be directly sent out from the WCB 320 and written into the memory 340.

With the high throughput mode, memory stall and degradation of the DNN accelerator can be avoided. Even though the total number of write transaction may be increased due to the lack of combination, the overall performance of the DNN accelerator can be better by avoiding memory hazards. The high throughput mode may be a trade-off between stalls and potential of combining write transactions, as the cost of combining write transactions in the presence of memory hazards may outweigh the benefits. In some embodiments, in the high throughput mode, the WCB 320 does not combine write transactions when a stall occurs. When there are no stalls, the WCB 320 may combine write transactions as if the high throughput mode was not enabled.

The combining module 408 combines write transactions, e.g., in embodiments where the WCB 320 operates in the combining mode and the high throughput mode is not enabled. The combining module 408 may determine whether two or more write transactions can be combined into one write transaction, e.g., by determining whether one or more conditions for combining write transactions are met. In response to determining that the write transactions can be combined, the combining module 408 may instruct the combiner 480 to combine the write transactions. In response to determining that the write transactions cannot be combined, the combining module 408 may instruct the combiner 480 not to combine the write transactions. The write transactions may be sent out from the WCB 320 and into the memory 340 separately. Alternatively, the new write transaction (i.e., the write transaction received by the WCB 320 later) may be stored in the WCB memory 460, and the old write transaction (i.e., the write transaction received by the WCB 320 earlier) may be sent out from the WCB 320.

In some embodiments, the combining module 408 determines whether the data blocks in two write transactions are designated for a same address in the memory 340, e.g., based on metadata in the two write transactions. In response to determining that the write transactions are designated for the same memory address, the combining module 408 may determine to combine the write transactions or determine whether the write transactions meet one or more other conditions for combination. In response to determining that the write transactions are designated for different memory addresses, the combining module 408 may determine not to combine the write transactions.

The combining module 408 may also determine whether all bytes in any one of the write transactions are enabled. In response to determining that all bytes in a write transaction are enabled, the combining module 408 may not combine write transaction with any other write transactions. As described above, a write transaction may include a fixed number (e.g., 32) of available bytes. The fixed number may be larger than the number of bytes in the data block of the write transaction. For instance, the number of bytes in the data block may be 16. That way, one or more available bytes in the write transaction are not used by the data block. These unused bytes are unenabled, as there is no data to write. An unenabled byte is not written into the memory 340. Accordingly, even though a write transaction includes a data block, the write transaction may still have bytes available for another data block to be combined with.

In some embodiments, after determining that all the available bytes in a write transaction are enabled (i.e., the write transaction has no available bytes), the combining module 408 may determine not to combine the write transaction with any other write transactions, and the write transaction will be written into the memory 340 separately from other write transactions. After determining that not all the available bytes in a write transaction are enable (i.e., the write transaction has one or more available bytes), the combining module 408 may determine to combine the write transaction with another write transaction. During the combination, the data block in the other write transaction can take the unenabled bytes in the write transaction. A new write transaction is formed from the combination, and the new write transaction includes the data blocks of both write transactions. The new write transaction may be either sent out from the WCB 320 or be stored in the WCB memory 460 for further combination.

For the further combination of the new write transaction, the combining module 408 may determine whether all the available bytes in the new write transaction are enabled. In embodiments where all the available bytes in the new write transaction are enabled, the combining module 408 determines not to further combine the new write transaction. In embodiments where not all the available bytes in the new write transaction are enabled, the combining module 408 determines to further combine the new write transaction with another write transaction. The other write transaction may be a combined write transaction (e.g., a write transaction that include multiple data blocks) or a write transaction that has not been combined with any other write transactions yet.

To determine whether to combine write transactions, the combining module 408 may also determine whether write transactions fall into the same halo region(s). A data block that falls into a halo region is to be replicated into the local memory of another compute tile for further computation. Halo region may exist in embodiments where the workload of the convolution is too big for one compute tile to complete, so the workload is distributed to multiple compute tiles and these compute tiles may run in parallel. By splitting the workload to multiple compute tiles, the performance of available compute resources can be improved or even maximized. In an example, a convolutional layer in a DNN may be processed by compute tile 0. The output tensor of the convolutional layer may be the input for the next convolutional layer in the DNN. The workload for the next convolutional layer may be partitioned across multiple compute tiles, e.g., compute tiles 0, 1, and 2. This partition may require some portions of the output tensor to be provided to compute tiles 1 and 2. These portions of the output tensor are considered as halo regions, as they are typically located at the edge of the output tensor.

In some embodiments, the combining module 408 prevents combining write transactions that do not fall into the same halo region(s). In some embodiments, even after the combining module 408 determines that the write transactions fall into the same halo region(s), the combining module 408 may further determine whether the data blocks in the write transactions have the same Y coordinate and whether the local tensor and the remote tensor(s) have the same width (i.e., the same dimension in the X-axis). In an embodiment where the data blocks fall into the same halo region(s) but have different Y coordinates and the local tensor has a different width from the remote tensor, the combining module 408 instructs the combiner 480 not to combine the write transactions. In another embodiment where the data blocks fall into the same halo region(s) and have the same coordinates or the local tensor has the same width as the remote tensor, the combining module 408 instructs the combiner 480 to combine the write transactions and form a combined write transaction.

A combined write transaction may be further combined with another write transaction. The combining module 408 may determine whether the combined write transaction and the other write transaction meets one or more conditions, e.g., the conditions described above.

The flush module 409 flushes the WCB memory 460 to send all write transactions in the WCB memory 460 out from the WCB 320. The WCB memory 460 can be used as a buffer to delay sending write transactions out from the WCB 320. The flush module 409 may end or avoid the delay by flushing the WCB memory 460. In a flush, the flush module 409 may send all write transactions in the WCB memory 460 out so that the WCB memory 460 can become empty after the flush.

In some embodiments, the flush module 409 performs timed flushes. The flush module 409 may determine a time when to flush the WCB memory 460 based on a state of the memory 340. For instance, the flush module 409 may detect that there is low or no activity (read or write activity) at the memory 340. After a predetermined amount of time after the detection, the flush module 409 flushes the WCB memory 460. Write transaction(s) flushed out from the WCB memory 460 are written into the memory 340 without being combined with any other write transactions. Such a flush may be advantageous in cases where there are times of high and low activity at the memory 340.

In some embodiments, as write transactions are buffered in the WCB memory 460, the write transactions need to be flushed out at the end once all data in the output tensor has been generated and received. The cost of the delay incurred by buffering and combining write transactions can outweigh the benefit of combining write transactions and reducing the total number of write transactions. In some scenarios, the power saved from not buffering and combining write transactions may be unneglectable.

In some embodiments, the flush module 409 may determine whether the entire workload of writing the output tensor into the memory 340 has been processed. For instance, the flush module 409 may determine whether any further write transaction for the output tensor will enter the WCB 320. In response to determining that the entire workload has been processed or that no further write transaction will enter the WCB 320, the flush module 409 may activate flush to empty out the WCB memory 460 and send out any remaining buffered write transactions to the memory 340. More details regarding flushing the WCB memory 460 are provided below in conjunction with FIG. 8.

FIG. 4B illustrates example write transaction combinations performed by the WCB 320 in FIG. 4A, in accordance with various embodiments. FIG. 4B shows a table that lists information of write transactions 411, 412, 421, 422, 423, 431, 432, 433, 441, 442, and 443, each of which has 32 available bytes represented by indexes 0-31 in the second row of the table. The table shows enablement values (as opposed to data value) of the 32 bytes in each of the write transactions 411, 412, 421, 422, 423, 431, 432, 433, 441, 442, and 443. The enablement value of a byte is either 1 or 0 and indicates whether the corresponding byte is enabled or not.

The write transaction 411 is received by the WCB 320. The write transaction 411 includes one data block having 16 bytes. As shown in FIG. 4B, the data block takes bytes 0-15 in the write transaction 411. The bytes 16-31 in the write transaction 411 are not taken. Also, some of the bytes 0-15 are not enabled and their enablement values are 0. After the WCB 320 receives the write transaction 411, the write transaction 411 is mapped to a location in the WCB memory 460 and is stored at the location as a write transaction 412. The write transaction 412 includes the data block and metadata in the write transaction 411 and has the same address as the write transaction 411. The WCB 320 sets the enablement values of the unused bytes 16-31 to 0 in the write transaction 412.

The WCB 320 also receives the write transaction 421, e.g., at a different time from the time when the WCB 320 receives the write transaction 411. The write transaction 421 includes one data block having 16 bytes, which take bytes 16-31 in the write transaction 421. Some of the bytes in the data block are unenabled. After the WCB 320 receives the write transaction 421, the WCB 320 maps the write transaction 421 to a location in the WCB memory 460. The WCB 320 may map the write transaction 421 to the same location where the write transaction 412 is stored. The write transaction 421 may be buffered as a write transaction 422 (e.g., in the third buffer 430) and the write transaction 412 is retrieved from the location (e.g., from the WCB memory 460 for being stored in the read buffer 450). The write transaction 422 includes the data block and metadata in the write transaction 421 and has the same 32-byte aligned address as the write transaction 421. The WCB 320 sets the enablement values of the unused bytes 0-15 to 0 in the write transaction 422.

As the address of the write transaction 412 is 0x200 and the address of the write transaction 422 is 0x200, the WCB 320 determines that the two write transaction 412 and 422 have the same 32-byte aligned address in the memory 340. The WCB 320 may also determine that the write transaction 412 and 422 meet one or more other conditions for combination. Then the WCB 320 combines the write transaction 412 and 422 and forms a new write transaction 423. The new transaction 423 includes the data blocks in the write transaction 412 and 422. As the data blocks in the write transaction 412 and 422 have unenabled bytes, the transaction 423 has unenabled bytes and may still be further combined. The WCB 320 stores the new transaction 423 in the WCB memory 460, e.g., at the location where the write transaction 412 and 422 are mapped to, as opposed to sending the transaction 423 to the memory 340.

The WCB 320 receives the write transaction 431. The write transaction 431 includes one data block having 16 bytes, which take bytes 16-31 in the write transaction 431. Some of the bytes in the data block are unenabled. After the WCB 320 receives the write transaction 431, the WCB 320 maps the write transaction 431 to a location in the WCB memory 460. The WCB 320 may map the write transaction 431 to the same location where the write transaction 423 is stored. The write transaction 431 is buffered as a write transaction 432 and the write transaction 423 is retrieved from the location. The write transaction 432 includes the data block and metadata in the write transaction 431 and has the same 32-byte aligned address as the write transaction 431. The WCB 320 sets the enablement values of unused bytes 0-15 to 0 in the write transaction 432.

Next, the WCB 320 combines the write transactions 423 and 432 and forms a new write transaction 433. The enabled bytes in the write transaction 432 may be placed into the unenabled bytes in the write transaction 423, or the other way. The write transaction 433 therefore include all the enabled bytes of the write transactions 423 and 432. As there are still unenabled bytes in the write transaction 433, the write transaction 433 can be further combined and is still stored in the WCB memory 460.

The WCB 320 further receives the write transaction 441. The write transaction 441 includes one data block having 16 bytes, which take bytes 0-15 in the write transaction 441. Some of the bytes in the data block are unenabled. After the WCB 320 receives the write transaction 441, the WCB 320 maps the write transaction 441 to a location in the WCB memory 460. The WCB 320 may map the write transaction 441 to the same location where the write transaction 433 is stored. The write transaction 441 is buffered as a write transaction 442 and the write transaction 433 is retrieved from the location. The write transaction 442 includes the data block and metadata of the write transaction 441 and has the same address as the write transaction 441. The WCB 320 sets the enablement values of the unused bytes 16-31 to 0 in the write transaction 442.

Next, the WCB 320 combines the write transactions 433 and 442 and forms a new write transaction 443. The enabled bytes in the write transaction 442 may be placed into the unenabled bytes in the write transaction 433, or the other way. The write transaction 443 therefore includes all the enabled bytes of the write transactions 433 and 442. As all the 32 bytes in the write transaction 443 are enabled, the write transaction 443 cannot be combined with any other write transactions. The write transaction 443 can be written into the memory 340 from the WCB memory 460.

Example Halo Regions

Figure 5:
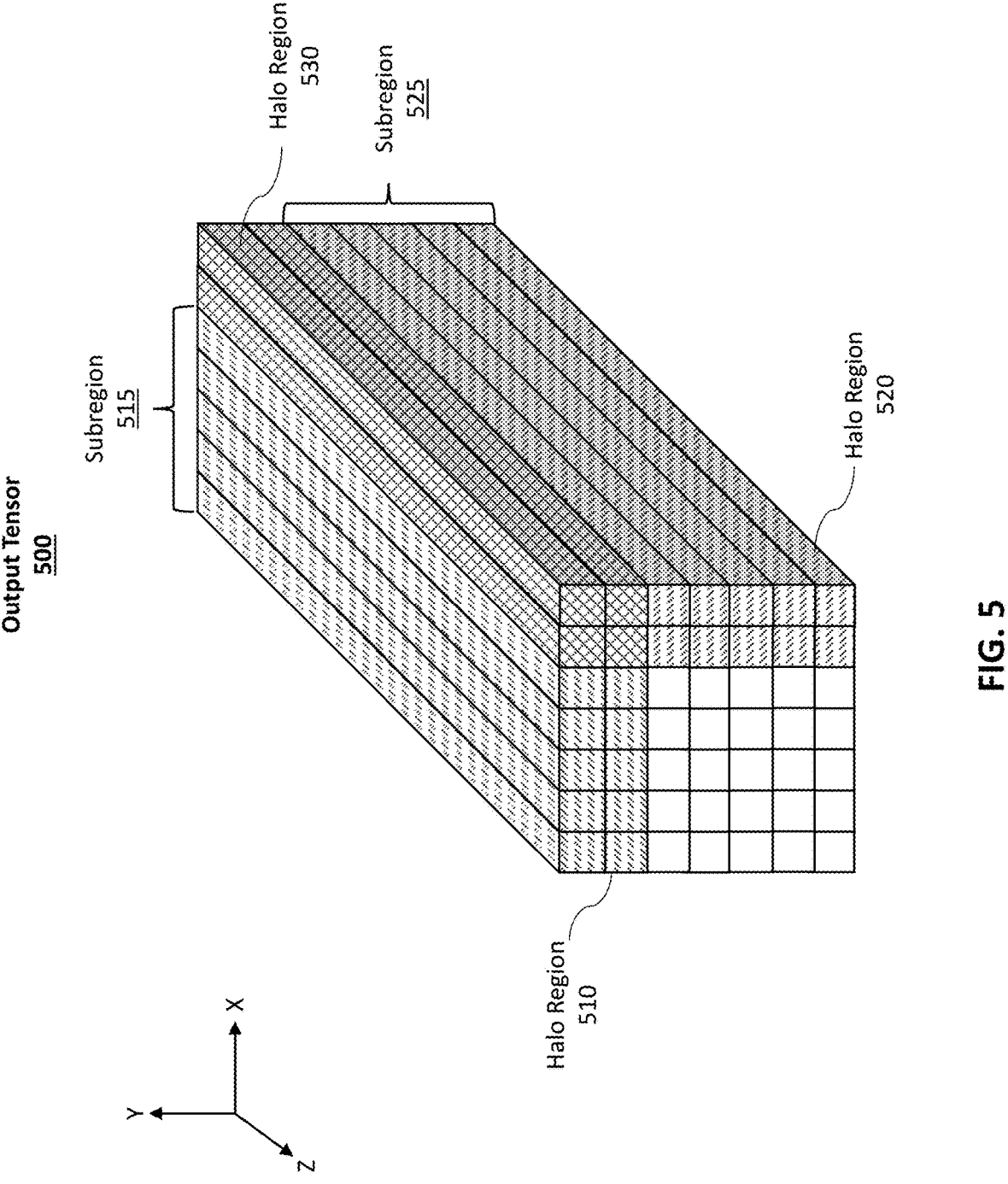
FIG. 5 illustrates an example output tensor including halo regions, in accordance with various embodiments, in accordance with various embodiments.

FIG. 5 illustrates an example output tensor 500 including halo regions 510, 520, and 530, in accordance with various embodiments. The output tensor 500 may be a result of a convolution performed by a compute tile, e.g., the compute tile 300. The convolution may be in a convolutional layer of a DNN. The output tensor 500 can be written into a local memory of the compute tile, such as the memory 340, by a WCB, such as the WCB 320. In some embodiments, the output tensor 500 is written into the local memory through a series of write transactions, each of which includes a portion of the output tensor.

After being written into the local memory, the output tensor 500 can be used in further computation by the compute tile 300. For instance, the compute tile 300 may use the output tensor 500 as an input tensor for a convolution in another convolutional layer in the DNN. This second convolution, for which the output tensor forms at least part of the input tensor, may be performed by the compute tile and three other compute tiles in parallel, e.g., due to the reason that the workload of the second convolution is too big for the compute tile to run by itself. The compute tile is referred to as the local compute tile, and the three other compute tiles are referred to as remote compute tiles. The halo regions 510, 520, and 530 are to be duplicated into tensors to be used by the remote compute tiles to perform their portions of the second convolution. The output tensor 500 is referred to as the local tensor, and the tensors for the remote compute tiles is referred to as remote tensors. The remote tensors may be stored in the local memories of the remote compute tiles.

As shown in FIG. 5, the halo regions 510, 520, and 530 are located at edges of the output tensor 500. Each of the halo regions 510, 520, and 530 spans across all the output channels of the output tensor 500, i.e., the dimensions of the halo regions 510, 520, and 530 along the Z-axis are the same as the corresponding dimension of the output tensor 500. In the embodiments of FIG. 5, the halo region 530 is included in the halo regions 510 and 520. The halo region 510 includes a subregion 515 and the halo region 530. The halo region 520 includes a subregion 525 and the halo region 530. The spatial size the output tensor may be denoted as $7 \times 7 \times C_{out}$, the spatial size of the halo region 510 can be denoted as $7 \times 2 \times C_{out}$, the spatial size of the halo region 520 can be denoted as $2 \times 7 \times C_{out}$, the spatial size of the halo region 530 can be denoted as $2 \times 2 \times C_{out}$, the spatial size of the subregion 515 is $5 \times 2 \times C_{out}$, the spatial size of the subregion 525 is $2 \times 5 \times C_{out}$.

Each of the halo regions 510, 520, and 530 may be written into a local memory through multiple write transactions. A write transaction includes a data block in the corresponding halo region 510, 520, or 530. The write transaction also includes metadata indicating the halo region 510, 520, or 530 that the data block falls into. The metadata can be used to determine whether the write transaction can be combined with one or more other write transactions. In some embodiments, a write transaction including data in a halo region may not be combined. In an embodiment, two write transactions, the data blocks of which fall into different halo regions, cannot be combined. Write transactions including data blocks from the same halo region may be combined. In an example, a write transaction including data in the subregion 515 may be combined with another write transaction including data in the subregion 515, but cannot be combined with a write transaction including data in the halo region 520 or 530. In another example, a write transaction including data in the subregion 525 may be combined with another write transaction including data in the subregion 525, but cannot be combined with a write transaction including data in the halo region 510 or 530. In yet another example, a write transaction including data in the halo region 530 may be combined with another write transaction including data in the halo region 530, but cannot be combined with a write transaction including data in the subregion 515 or 525.

The data block in a write transaction may fall into multiple halo regions. For instance, the data blocks in the halo region 530 are considered as falling into all the three halo regions 510, 520, and 530, and are duplicated into all the three remote tensors.

Figure 6:
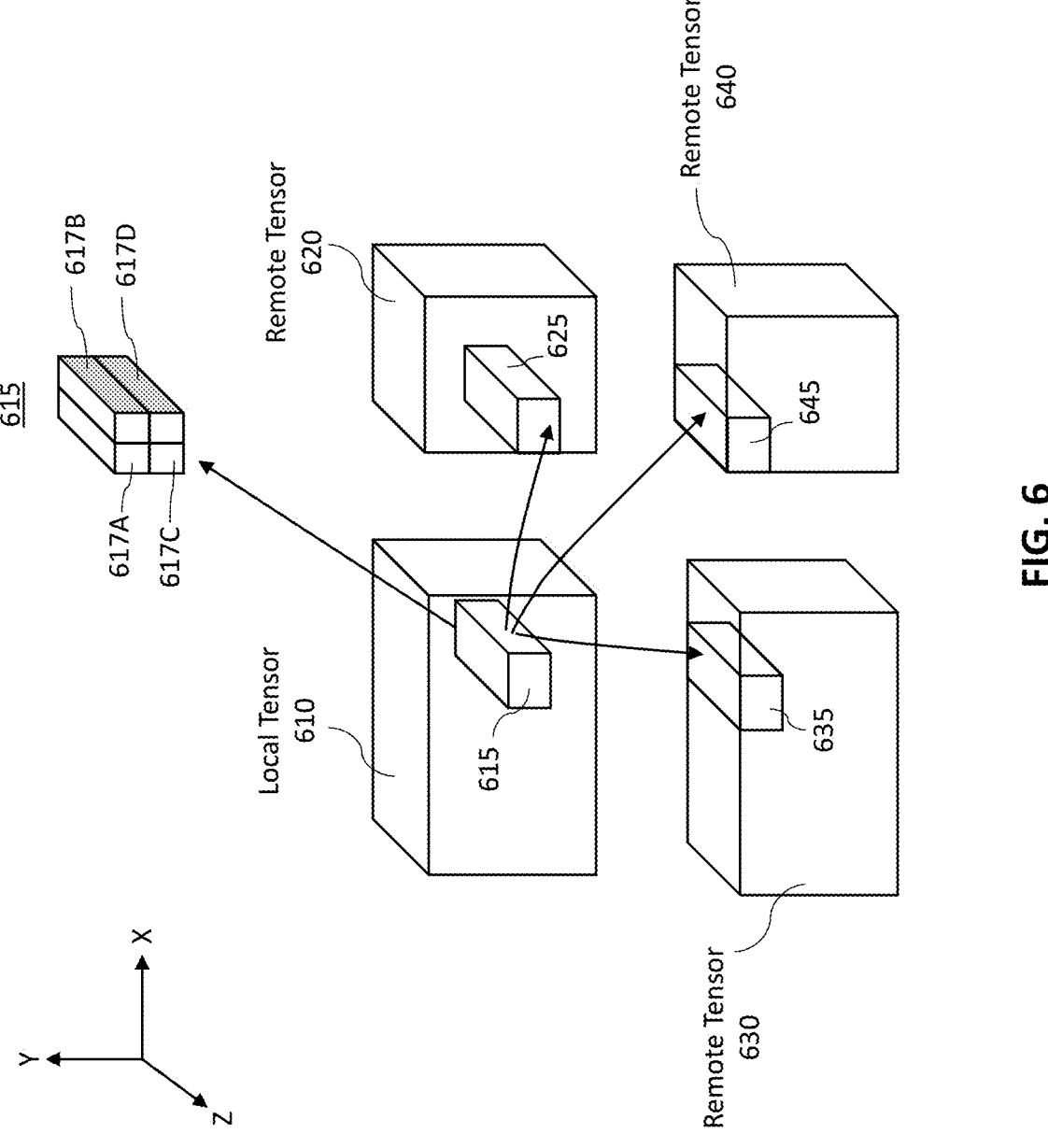
FIG. 6 illustrates replication of a halo region from a local tensor to remote tensors, in accordance with various embodiments.

FIG. 6 illustrates replication of a halo region 615 from a local tensor 610 to remote tensors 630, 640, and 650, in accordance with various embodiments. The local tensor 610 may be an output tensor of a first convolution that has been performed by a local compute tile. The combination of the local tensor 610 and remote tensors 630, 640, and 650 can be an input tensor of a second convolution to be performed by the local compute tile and three remote compute tiles in parallel. The first convolution may correspond to a first convolutional layer in a DNN, the second convolution may correspond to a second convolutional layer in a DNN. The first convolutional layer and the second convolutional layer may be adjacent in a sequence of layers in the DNN.

In some embodiments, the input tensor of the second convolution is partitioned across the width of the input tensor, e.g., across the X-axis, to produce the local tensor 610 and remote tensors 630, 640, and 650. The specific partitioning of the input tensor in conjunction with the spatial size of the halo region 615 may result in variations in widths of the local tensor 610 and remote tensors 630, 640, and 650. As shown in FIG. 6, even though the remote tensor 630 has the same width (i.e., same dimension along the X-axis) as the local tensor 610, the remote tensors 640 and 650 have different widths from the local tensor 610. Due to the variation in the widths of the local tensor 610 and remote tensors 630, 640, and 650, certain write transactions that include data blocks in the halo region 615 may not be combined with each other.

When it comes to the transfer of halo data (e.g., activation or sparsity data in the halo region 740), in embodiments where the width of a local tensor is the same as the width of a remote tensor, the halo data in the local tensor can be transferred into the appropriate memory location of the remote compute tile by applying a fixed offset to the addresses of the write transactions of the halo data. In embodiments where the width of a local tensor is different from the width of a remote tensor, a more complex manipulation of the addresses is necessary to adjust for the different layout of data in memory. The adjustment is dependent on the Y coordinate of the halo data. The memory addresses of write transactions of halo data having different Y coordinates would each require a different offset, which may prevent write transactions of data block that have different Y coordinates and fall into a halo region with tensors of different widths from being combined.

As shown in FIG. 6, the halo region 615 includes four data blocks 617A-617D. Each of the data blocks 617A-617D is a vector that spans across the entire depth of the local tensor 610. In other embodiments, a vector spanning across the entire depth of the local tensor 610 may include multiple data blocks. Also, the number of vectors in the halo region 615 may be a different number from four. The four data blocks 617A-617D correspond to four write transactions to be processed by the WCB. Even though the data blocks 617A-617D belong to the same halo region 615, the WCB does not combine any two of the four write transactions when these two write transactions have different Y coordinates. For instance, the WCB does not combine the write transaction of the data block 617A with the write transaction of the data block 617C or with the write transaction of the data block 617D. Also, the WCB does not combine the write transaction of the data block 617B with the write transaction of the data block 617C or with the write transaction of the data block 617D. The WCB may combine the write transaction of the data block 617A with the write transaction of the data block 617B. The WCB may also combine the write transaction of the data block 617C with the write transaction of the data block 617D.

FIG. 7 illustrates unequally sized tensors 715, 725, and 735 for a convolution run by multiple compute tiles, in accordance with various embodiments. For purpose of simplicity and illustration, FIG. 7 shows 2D views of the tensors

715, 725, and 735 and halo regions 740, 750, 760, and 770. The tensors 715, 725, and 735 and halo regions 740, 750, 760, and 770 may each be a 3D matrix that includes a plurality of channels, where each channel has a 2D matrix. The 2D views in FIG. 7 may be 2D matrixes of an individual channel.

In the embodiments of FIG. 7, an output tensor of a convolution run by three compute tiles is split into three subtensors 710, 720, and 730. The output tensor has a width of 15, i.e., there are 15 activations along the X-axis. The subtensors 710, 720, and 730 have a same width of 5, i.e., each of the three subtensors 710, 720, and 730 includes 5 activations along the X-axis. Due to the partition of the workload of the convolution into three compute tiles and the assumption that the next convolution requires access to adjacent data elements computed in the other compute tiles, the halo regions 740, 750, 760, and 770 need to be added into each of the three subtensors 710, 720, and 730. In some embodiments, the halo regions 740, 750, 760, and 770 may include the same activations and have the same spatial size. As shown in FIG. 7, the halo region 740 is added into an edge of the subtensor 710. The halo regions 750 and 760 are added to opposing edges of the subtensor 720. The halo region 770 is added to an edge of the subtensor 730. These edges of the subtensors 710, 720, and 730 are edges at which the output tensor was split into the subtensors 710, 720, and 730. The addition of the halo regions 740, 750, 760, and 770 into the subtensors 710, 720, and 730 results in three tensors 715, 725, and 735 for the three compute tiles, respectively. The three tensors 715, 725, and 735 can be stored in the local memories of the three compute tiles. In some embodiments, space for the activations in the halo regions 740, 750, 760, and 770 can be reserved in the tensors 715, 725, and 735, and the reserved space can be filled with the activations when the compute tiles receive these activations, e.g., through a halo pipeline (e.g., the halo pipeline 350 in FIG. 3). As an example, the halo region 740 in FIG. 7 has a width of 1. With a halo width of 1 and a tensor width of 15, the workload partition across the three compute tiles does not result in equally sized subtensors. As shown in FIG. 7, the tensor 715 has a width of 6, the tensor 725 has a width of 7, and the tensor 735 has a width of 6. In the embodiments of FIG. 7, even though the input tensor was evenly split, the widths of the tensors 715, 725, and 735, which are to be processed by the compute tiles, are different.

Example Timed Flush

Figure 8:
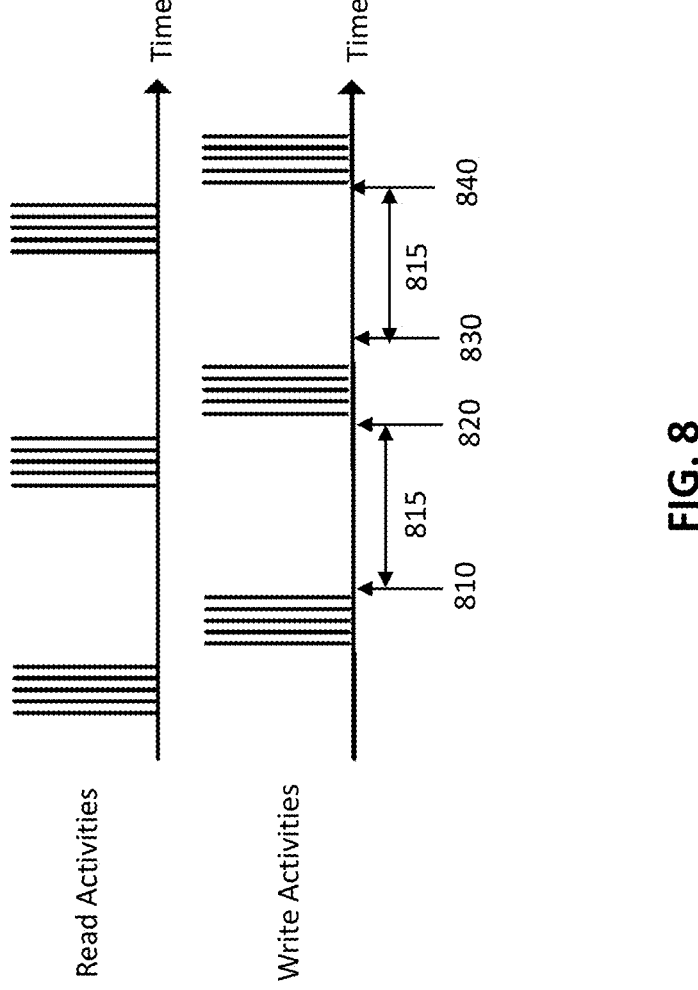
FIG. 8 illustrates timed flushes of a WCB memory, in accordance with various embodiments.

FIG. 8 illustrates timed flushes of a WCB memory, in accordance with various embodiments. The WCB memory may be the WCB memory 460 in FIG. 4. The timed flushes may be managed by the flush module 409 in FIG. 4A. FIG. 8 shows read activities and write activities of a local memory of a compute tile, e.g., the memory 340, on a time axis. The flush module 409 monitors state of the local memory and uses the state of the local memory to time flushes of the WCB memory. In the embodiments of FIG. 8, the flush module 409 looks at the write activities of the local memory. A write activity may be a write of data into the local memory. The flush module 409 detects, at a first time 810, that there are no write activities at the local memory, i.e., no data is written into the local memory. After a predetermined delay 815, the flush module 409 triggers a flush of the WCB memory at a second time 820. The flush of the WCB memory can cause write transactions stored in the WCB memory to be sent out and written into the local memory. Accordingly, there are write activities at the local memory after the flush is triggered. The flush module 409 continues to monitor the state of the local memory. At a third time 830, the flush module 409 detects again that there is no write activity at the local memory. The flush module 409 triggers another flush of the WCB memory at a fourth time 840 based on the detection. The time of period between the third time 830 and the fourth time 840 is the predetermined delay 815.

As shown in FIG. 8, given the predetermined delay 815, the flushes are conducted at times when no read activity happens, which can reduce contention at the memory and therefore improve the performance of the compute tile 300. In some embodiments, the flush module 409 determines the predetermined delay 815 based on the workload of writing a particular output tensor into the local memory. The predetermined delay 815 may vary for different workloads, as the memory access pattern can vary from workload to workload. In some embodiments, the flush module 409 may determine the predetermined delay 815 further based on the subsequent workload of reading input tensor data into the local memory, as the subsequent workload may be started and begin reading form memory while the current workload is still executing.

As the write transactions stored in the WCB memory are sent out during each flush, the write transactions are not combined with any other write transactions that come into the WCB at later times. Accordingly, the flush does not reduce the number of write transactions. Even if some or all of these write transactions would have been combined if the flush did not happy, the flush can still improve the overall performance of the compute tile given that it can reduce memory contention and avoid potential stalling.

In the embodiment of FIG. 8, the flush module 409 triggers flushes based on absence of write activities at the local memory. In another embodiment, the flush module 409 may trigger flushes based on absence of both write activities and read activities at the local memory. In yet another embodiment, the flush module 409 may trigger flushes based on a detection of low write (or write and read) activities at the local memory. For instance, the flush module 409 may identify the number of memory accesses per clock cycle at the local memory and determine whether the number of memory accesses per clock cycle is below a threshold number. In response to determining that the number of memory accesses per clock cycle is below the threshold number, the flush module 409 triggers a flush of the WCB memory after a predetermined delay. The number of memory accesses per clock cycle may be an average number of memory accesses per clock cycle. The flush module 409 may identify a number of clock cycles and determine the total number of memory accesses in the first number of clock cycles. The average number of memory accesses per clock cycle may equal the total number of memory accesses divided by the number of clock cycles.

Example DNN Accelerator

FIG. 9 is a block diagram of an example DNN accelerator 900, in accordance with various embodiments. The DNN accelerator 900 can run DNNs, e.g., the DNN 100 in FIG. 1. The DNN accelerator 900 includes a memory 910, a DMA engine 920, a compute tile 930, and a memory 940 inside the compute tile 930. In other embodiments, alternative configurations, different or additional components may be included in the DNN accelerator 900. For instance, the DNN accelerator 900 may include more than one memory 910 or 940, more than one DMA engine 920, or more than one compute tile 930. Further, functionality attributed to a component of the DNN accelerator 900 may be accomplished by a different component included in the DNN accelerator 900 or by a different system.

The memory 910 stores data to be used by the compute tile 930 to perform deep learning operations in DNN models. Example deep learning operations include convolutions (also referred to as "convolutional operations"), pooling operations, elementwise operations, other types of deep learning operations, or some combination thereof. The memory 910 may be a main memory of the DNN accelerator 900. In some embodiments, the memory 910 includes one or more DRAMs (dynamic random-access memory). For instance, the memory 910 may store the input tensor, convolutional kernels, or output tensor of a convolution in a convolutional layer of a DNN, e.g., the convolutional layer 110. The output tensor can be transmitted from the memory 940 to the memory 910 through the DMA engine 920.

In other embodiments, the input tensor or output tensor is not stored in the memory 910. For instance, the input tensor may be directly transmitted from an internal memory of another MAC unit array to the memory 940 in the compute tile 930. The output tensor may be directly transmitted from the memory 940 in the compute tile 930 into an internal memory of another compute tile. The input tensor may be a 3D matrix and include $C_{in}$ input channels. Examples of the input tensor include the input tensor 140 in FIG. 1. The output tensor may be a 3D matrix and include $C_{out}$ output channels. Examples of the output tensor include the output tensor 160 in FIG. 1, the output tensor 200 in FIG. 2, or output tensor 500 in FIG. 5.

The DMA engine 920 facilitates data transfer between the memory 910 and the memory 940. For example, the DMA engine 920 can read data from the memory 910 and write data into the memory 940. As another example, the DMA engine 920 can read data from the memory 940 and write data into the memory 910. The DMA engine 920 provides a DMA feature that allows the compute tile 930 to initiate data transfer between the memory 910 and the memory 940 and to perform other operations while the data transfer is in being conducted. In some embodiments, the DMA engine 920 may read tensors from the memory 910, modify the tensors in a way that is optimized for the compute tile 930 before it writes the tensors into the memory 940.

The compute tile 930 performs computation for deep learning operations. The compute tile 930 may run the operations in a DNN layer, or a portion of the operations in the DNN layer. In some embodiments, the operations of the DNN layers may be run by one or more other compute tiles in parallel with the compute tile 930. The compute tile 930 may perform convolutions, e.g., standard convolution or depthwise convolution. In some embodiments, the compute tile 930 receives an input tensor and one or more convolutional kernels and performs a convolution with the input tensor and convolutional kernels. The result of the convolution may be an output tensor, which can be further computed, e.g., by another compute tile. The input tensor, convolutional kernels, or output tensor may be stored in the memory 940. An embodiment of the compute tile 930 is the compute tile 300 in FIG. 3.

The memory 940 is local to the compute tile 930. In the embodiments of FIG. 9, the memory 940 is inside the compute tile 930. In other embodiments, the memory 940 may be outside the compute tile 930. The memory 940 and the compute tile 930 can be implemented on the same chip. In some embodiments, the memory 940 includes one or more SRAMs. The memory 940 may be register files. In some embodiments, the memory 940 may also include one or more cache memories. The memory 940 stores data used for or generated from convolutions, e.g., input tensors, kernels, and output tensors. An input tensor or kernel may be written into the memory 940 by the DMA engine 920. An output tensor may be loaded into the memory 940 by a WCB in the compute tile 930. An embodiment of the memory 940 is the memory 340 in FIG. 3.

Example MAC Array

Figure 10:
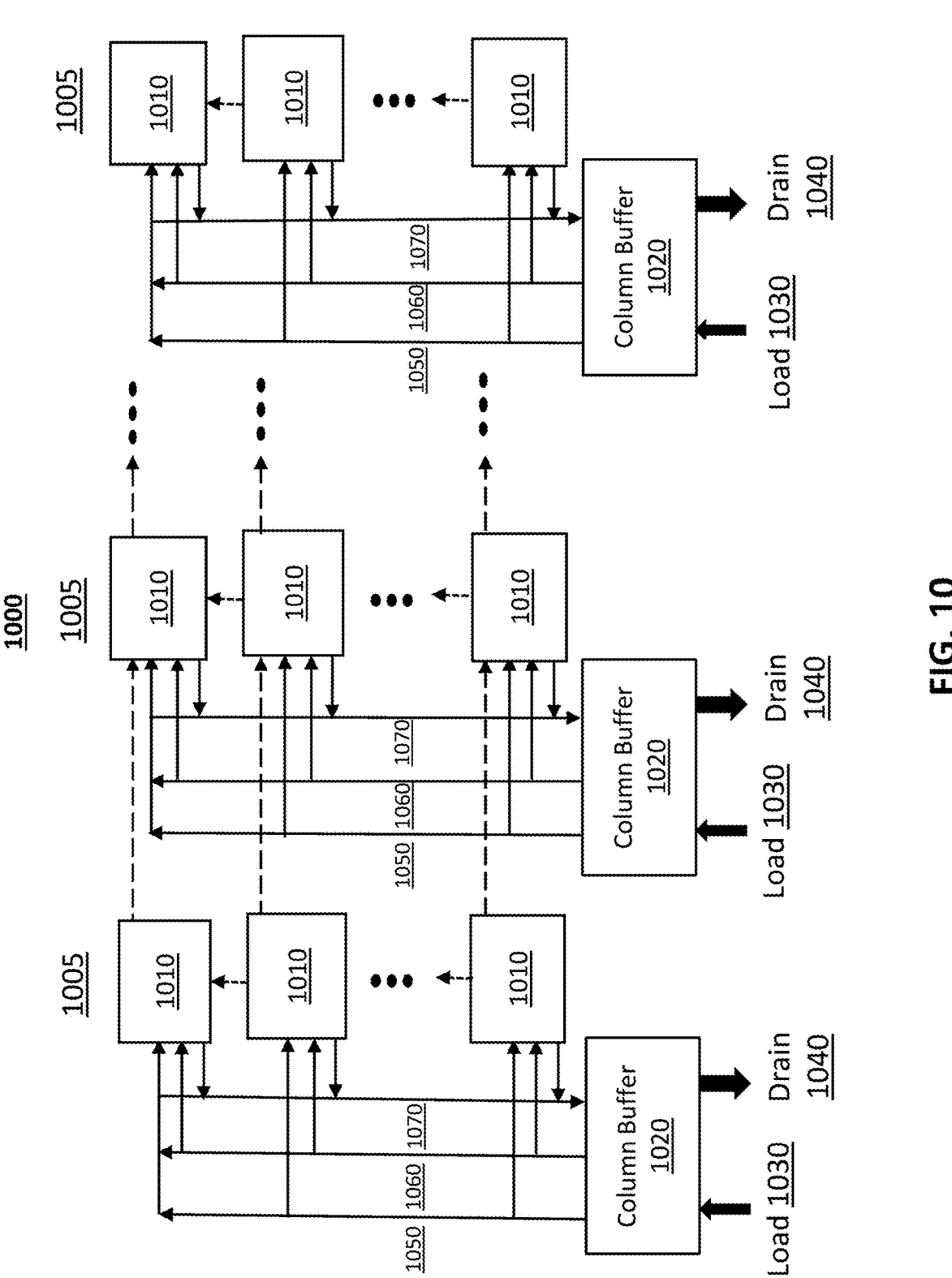
FIG. 10 illustrates an example MAC array, in accordance with various embodiments.

FIG. 10 illustrates an example MAC array 1000, in accordance with various embodiments. The MAC array 1000 is an embodiment of the MAC array 310 in FIG. 3. The MAC array 1000 includes a plurality of MAC units 1010 (individually referred to as "MAC unit 1010"). The MAC units 1010 perform MAC operations, such as integer MAC operations, floating-point MAC operations, and so on. The MAC units 1010 may also be referred to as neurons or nodes in the DNN. Each MAC unit 1010 has 2 input signals 1050 and 1060 and an output signal 1070. The input signal 1050 is at least a portion of an input tensor of a convolution. The input signal 1060 is at least a portion of a filter of the convolution. In some embodiments, the input signal 1050 of a MAC unit 1010 includes one or more input operands, and the input signal 1060 includes one or more weight operands.

Each MAC unit 1010 performs an MAC operation on the input signals 1050 and 1060 and outputs the output signal 1070, which is a result of the MAC operation. Some or all of the input signals 1050 and 1060 and the output signal 1070 may be in an integer format, such as INT8, or floating-point format, such as FP16 or BF16. For purpose of simplicity and illustration, the input signals and output signal of all the MAC units 1010 have the same reference numbers, but the MAC units 1010 may receive different input signals and output different output signals from each other. Also, a MAC unit 1010 may be different from another MAC unit 1010, e.g., including more, fewer, or different components.

As shown in FIG. 10, the MAC units 1010 are connected to each other, as indicated by the dash arrows in FIG. 10. The output signal 1070 of an MAC unit 1010 may be sent to many other MAC units 1010 (and possibly back to itself) as input signals via the interconnections between MAC units 1010. In some embodiments, the output signal 1070 of an MAC unit 1010 may incorporate the output signals of one or more other MAC units 1010 through an accumulate operation of the MAC unit 1010 and generates an internal partial sum of the MAC array. Certain aspects of the MAC units 1010 are described below in conjunction with FIG. 5.

In the embodiments of FIG. 10, the MAC units 1010 are arranged into columns 1005 (individually referred to as "column 1005" or "MAC column 1005"). The input and weights of the layer may be distributed to the MAC units 1010 based on the columns 1005. Each column 1005 has a column buffer 1020. The column buffer 1020 stores data provided to the MAC units 1010 in the column 1005 for a short amount of time. The column buffer 1020 may also store data output by the last MAC unit 1010 in the column 1005. The output of the last MAC unit 1010 may be a sum of the MAC operations of all the MAC units 1010 in the column 1005, which is a column-level internal partial sum of the MAC array 1000. In other embodiments, input and weights may be distributed to the MAC units 1010 based on rows in the MAC array 1000. The MAC array 1000 may include row buffers in lieu of column buffers 1020. A row buffer may store input signals of the MACs in the corresponding row and may also store a row-level internal partial sum of the MAC array 1000.

As shown in FIG. 10, each column buffer 1020 is associated with a load 1030 and a drain 1040. The data provided to the column 1005 is transmitted to the column buffer 1020 through the load 1030, e.g., through upper memory hierarchies, e.g., the memory 910 in FIG. 9. The data generated by the column 1005 is extracted from the column buffers 1020 through the drain 1040. In some embodiments, data extracted from a column buffer 1020 is sent to upper memory hierarchies, e.g., the memory 910 in FIG. 9, through the drain operation. In some embodiments, the drain operation does not start until all the MAC units 1010 in the column 1005 have finished their MAC operations. In some embodiments, the load 1030 or drain 1040 may be controlled by the DMA engine 920 in FIG. 9.

Example Method of Deep Learning

FIG. 11 is a flowchart showing a method 1100 of deep learning, in accordance with various embodiments. The method 1100 may be performed by the WCB 320 in FIG. 3. Although the method 1100 is described with reference to the flowchart illustrated in FIG. 11, many other methods for deep learning may alternatively be used. For example, the order of execution of the steps in FIG. 11 may be changed. As another example, some of the steps may be changed, eliminated, or combined.

The WCB 320 stores 1110 a first write transaction in an internal memory, e.g., the WCB memory 460. The first write transaction includes a first data block. The first data block is a result of one or more MAC operations performed by a compute tile for a convolutional layer in a DNN. The compute tile may be the compute tile 300 in FIG. 3. The convolutional layer may be a convolutional layer 110 in FIG. 1. In some embodiments, the compute tile produces an output tensor of the convolutional layer by performing a convolution with a number of filters. The output tensor includes the first data block and the second data block In some embodiments, the first write transaction further comprises metadata that specifies one or more attributes of the first data block. The WCB 320 stores the first write transaction in the internal memory by determining a memory location for the first write transaction based on the metadata and storing the first write transaction at the memory location in the internal memory. The WCB 320 may generate the first write transaction or the second write transaction by combining a third write transaction and a fourth write transaction. Each of the third write transaction and the fourth write transaction comprises a data block that is a result of one or more additional MAC operations performed by the compute tile.

The WCB 320 stores 1120 a second write transaction in the buffer. The second write transaction comprises a second data block. The second data block is a result of one or more other MAC operations performed by the compute tile for the convolutional layer in the DNN. The buffer may be the third buffer 430 in FIG. 4.

In some embodiments, the compute tile produces an output tensor of the convolutional layer by performing a convolution with one or more filters. The output tensor includes the first data block and the second data block. In some embodiments, each data block includes a sequence of output elements in the output tensor. An output element is a data point in the output tensor.

The WCB 320 determines 1130 whether to combine the first write transaction and the second write transaction. In some embodiments, the WCB 320 receives an instruction that specifies an operation mode of a write combine buffer. The WCB 320 determines that the operation mode is a bypass mode. Then the WCB 320 determines not to combine the first write transaction and the second write transaction In some embodiments, the first write transaction further comprises first metadata that specifies one or more attributes of the first data block. The second write transaction further comprises second metadata that specifies one or more attributes of the second data block. The WCB 320 determines whether to combine the first write transaction and the second write transaction based on the first metadata and the second metadata. For instance, the WCB 320 determines whether the first metadata or the second metadata indicates that all bytes in the first write transaction or the second write transaction are enabled, wherein an enabled byte is to be written into the memory. As another example, the first metadata specifies a first memory address for the first data block, and the second metadata specifies a second memory address for the second data block. The WCB 320 determines whether to combine the first data block and the second data block comprises determining whether the first memory address matches the second memory address.

In some embodiments, an output tensor of the convolutional layer includes the first data block and the second data block. The output tensor comprises a halo region. Data in each of the one or more halo regions is to be provided to another array of MAC units for performing further MAC operations. The WCB 320 determines whether to combine the first data block and the second data block by determining whether the first data block and the second data block are in a same halo region of the one or more halo regions.

In response to determining to combine the first data block and the second data block, the WCB 320 generates 1160 a combined write transaction by combining the first write transaction with the second write transaction. The WCB 320 writes 1170 the combined write transaction into a memory at a same location in the memory, wherein the memory is inside the compute tile.

In some embodiments, the WCB 320 determines that there is no write activity at the memory at a first time. The WCB 320 may write one or more write transactions stored in the internal memory into the memory at a second time. There is a predetermined delay between the first time and the second time.

Example Deep Learning Environment

Figure 12:
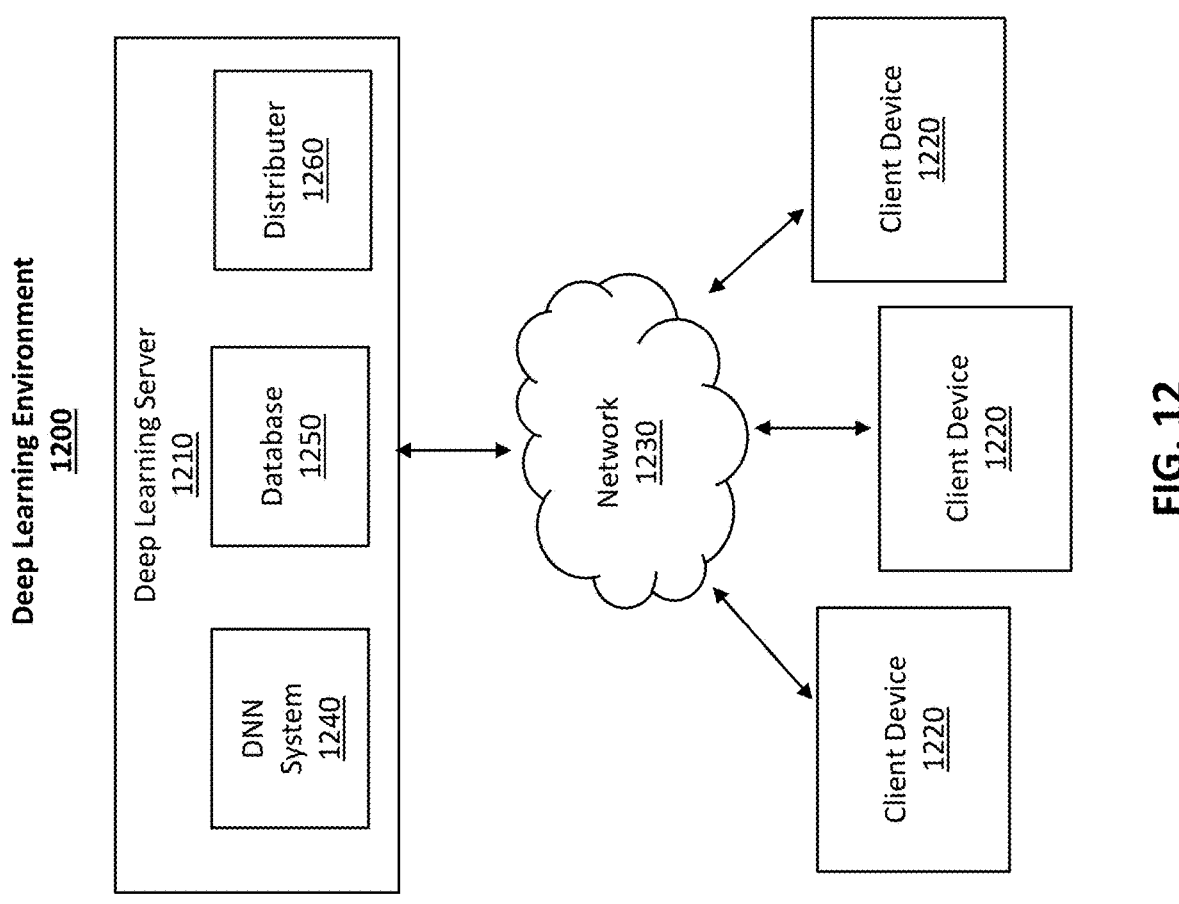
FIG. 12 illustrates a deep learning environment, in accordance with various embodiments.

FIG. 12 illustrates a deep learning environment 1200, in accordance with various embodiments. The deep learning environment 1200 includes a deep learning server 1210 and a plurality of client devices 1220 (individually referred to as client device 1220). The deep learning server 1210 is connected to the client devices 1220 through a network 1230. In other embodiments, the deep learning environment 1200 may include fewer, more, or different components.

The deep learning server 1210 trains deep learning models using neural networks. A neural network is structured like the human brain and consists of artificial neurons, also known as nodes. These nodes are stacked next to each other in 3 types of layers: input layer, hidden layer(s), and output layer. Data provides each node with information in the form of inputs. The node multiplies the inputs with random weights, calculates them, and adds a bias. Finally, nonlinear functions, also known as activation functions, are applied to determine which neuron to fire. The deep learning server 1210 can use various types of neural networks, such as DNN, recurrent neural network (RNN), generative adversarial network (GAN), long short-term memory network (LSTMN), and so on. During the process of training the deep learning models, the neural networks use unknown elements in the input distribution to extract features, group objects, and discover useful data patterns. The deep learning models can be used to solve various problems, e.g., making predictions, classifying images, and so on. The deep learning server 1210 may build deep learning models specific to particular types of problems that need to be solved. A deep learning model is trained to receive an input and outputs the solution to the particular problem.

In FIG. 12, the deep learning server 1210 includes a DNN system 1240, a database 1250, and a distributer 1260. The DNN system 1240 trains DNNs. The DNNs can be used to process images, e.g., images captured by autonomous vehicles, medical devices, satellites, and so on. In an embodiment, a DNN receives an input image and outputs classifications of objects in the input image. An example of the DNNs is the DNN 100 described above in conjunction with FIG. 1. In some embodiments, the DNN system 1240 trains DNNs through knowledge distillation, e.g., denseconnection based knowledge distillation. The trained DNNs may be used on low memory systems, like mobile phones, IOT edge devices, and so on. An embodiment of the DNN system 1240 is the DNN accelerator 200 described above in conjunction with FIG. 2.

The database 1250 stores data received, used, generated, or otherwise associated with the deep learning server 1210. For example, the database 1250 stores a training dataset that the DNN system 1240 uses to train DNNs. In an embodiment, the training dataset is an image gallery that can be used to train a DNN for classifying images. The training dataset may include data received from the client devices 1220. As another example, the database 1250 stores hyperparameters of the neural networks built by the deep learning server 1210.

The distributer 1260 distributes deep learning models generated by the deep learning server 1210 to the client devices 1220. In some embodiments, the distributer 1260 receives a request for a DNN from a client device 1220 through the network 1230. The request may include a description of a problem that the client device 1220 needs to solve. The request may also include information of the client device 1220, such as information describing available computing resource on the client device. The information describing available computing resource on the client device 1220 can be information indicating network bandwidth, information indicating available memory size, information indicating processing power of the client device 1220, and so on. In an embodiment, the distributer may instruct the DNN system 1240 to generate a DNN in accordance with the request. The DNN system 1240 may generate a DNN based on the information in the request. For instance, the DNN system 1240 can determine the structure of the DNN and/or train the DNN in accordance with the request.

In another embodiment, the distributer 1260 may select the DNN from a group of pre-existing DNNs based on the request. The distributer 1260 may select a DNN for a particular client device 1220 based on the size of the DNN and available resources of the client device 1220. In embodiments where the distributer 1260 determines that the client device 1220 has limited memory or processing power, the distributer 1260 may select a compressed DNN for the client device 1220, as opposed to an uncompressed DNN that has a larger size. The distributer 1260 then transmits the DNN generated or selected for the client device 1220 to the client device 1220.

In some embodiments, the distributer 1260 may receive feedback from the client device 1220. For example, the distributer 1260 receives new training data from the client device 1220 and may send the new training data to the DNN system 1240 for further training the DNN. As another example, the feedback includes an update of the available computing resource on the client device 1220. The distributer 1260 may send a different DNN to the client device 1220 based on the update. For instance, after receiving the feedback indicating that the computing resources of the client device 1220 have been reduced, the distributer 1260 sends a DNN of a smaller size to the client device 1220.

The client devices 1220 receive DNNs from the distributer 1260 and applies the DNNs to perform machine learning tasks, e.g., to solve problems or answer questions. In various embodiments, the client devices 1220 input images into the DNNs and use the output of the DNNs for various applications, e.g., visual reconstruction, augmented reality, robot localization and navigation, medical diagnosis, weather prediction, and so on. A client device 1220 may be one or more computing devices capable of receiving user input as well as transmitting and/or receiving data via the network 1230. In one embodiment, a client device 1220 is a conventional computer system, such as a desktop or a laptop computer. Alternatively, a client device 1220 may be a device having computer functionality, such as a personal digital assistant (PDA), a mobile telephone, a smartphone, an autonomous vehicle, or another suitable device. A client device 1220 is configured to communicate via the network 1230. In one embodiment, a client device 1220 executes an application allowing a user of the client device 1220 to interact with the deep learning server 1210 (e.g., the distributer 1260 of the deep learning server 1210). The client device 1220 may request DNNs or send feedback to the distributer 1260 through the application. For example, a client device 1220 executes a browser application to enable interaction between the client device 1220 and the deep learning server 1210 via the network 1230. In another embodiment, a client device 1220 interacts with the deep learning server 1210 through an application programming interface (API) running on a native operating system of the client device 1220, such as IOS® or ANDROID™.

In an embodiment, a client device 1220 is an integrated computing device that operates as a standalone network-enabled device. For example, the client device 1220 includes display, speakers, microphone, camera, and input device. In another embodiment, a client device 1220 is a computing device for coupling to an external media device such as a television or other external display and/or audio output system. In this embodiment, the client device 1220 may couple to the external media device via a wireless interface or wired interface (e.g., an HDMI (High-Definition Multimedia Interface) cable) and may utilize various functions of the external media device such as its display, speakers, microphone, camera, and input devices. Here, the client device 1220 may be configured to be compatible with a generic external media device that does not have specialized software, firmware, or hardware specifically for interacting with the client device 1220.

The network 1230 supports communications between the deep learning server 1210 and client devices 1220. The network 1230 may comprise any combination of local area and/or wide area networks, using both wired and/or wireless communication systems. In one embodiment, the network 1230 may use standard communications technologies and/or protocols. For example, the network 1230 may include communication links using technologies such as Ethernet, 12010.11, worldwide interoperability for microwave access (WiMAX), 3G, 4G, code division multiple access (CDMA), digital subscriber line (DSL), etc. Examples of networking protocols used for communicating via the network 1230 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1230 may be represented using any suitable format, such as hypertext markup language (HTML) or extensible markup language (XML). In some embodiments, all or some of the communication links of the network 1230 may be encrypted using any suitable technique or techniques.

Example DNN System

Figure 13:
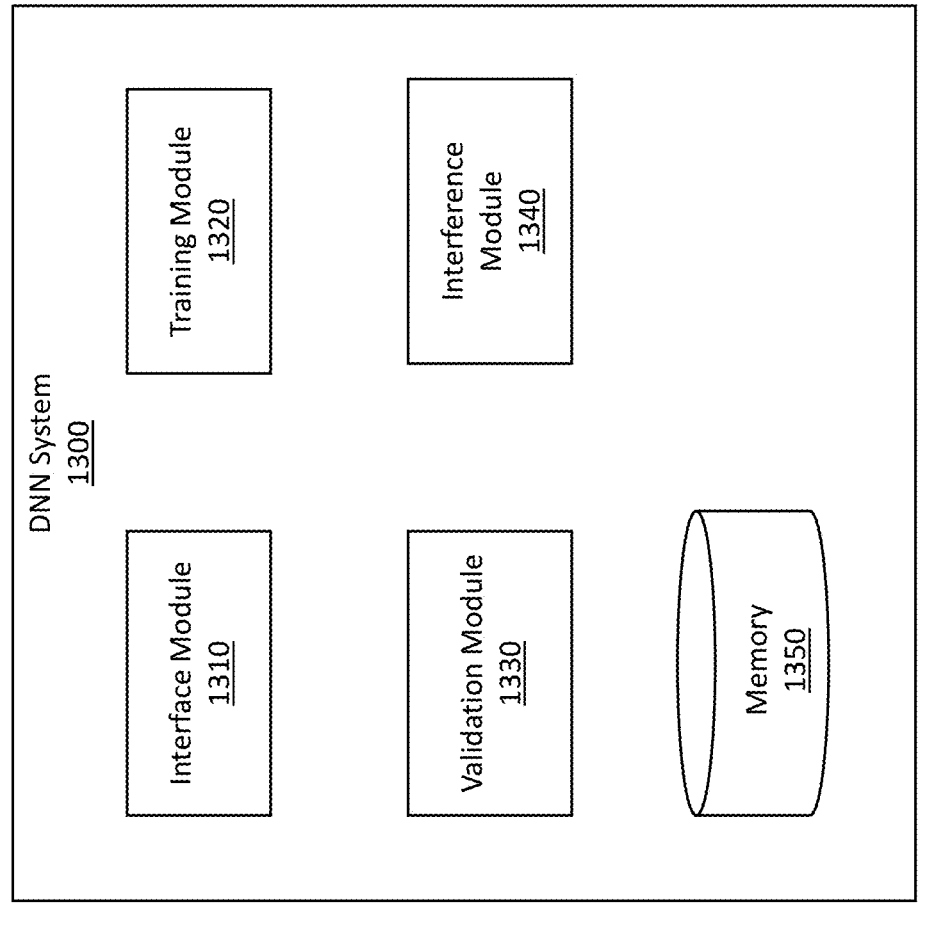
FIG. 13 is a block diagram of an example DNN system, in accordance with various embodiments.

FIG. 13 is a block diagram of an example DNN system 1300, in accordance with various embodiments. The whole DNN system 1300 or a part of the DNN system 1300 may be implemented in the computing device 1400 in FIG. 14. The DNN system 1300 trains DNNs for various tasks, such as image classification, learning relationships between biological cells (e.g., DNA, proteins, etc.), control behaviors for devices (e.g., robots, machines, etc.), and so on. The DNN system 1300 includes an interface module 1310, a training module 1320, a validation module 1330, an inference module 1340, and a memory 1350. In other embodiments, alternative configurations, different or additional components may be included in the DNN system 1300. Further, functionality attributed to a component of the DNN system 1300 may be accomplished by a different component included in the DNN system 1300 or a different system. The DNN system 1300 or a component of the DNN system 1300 (e.g., the training module 1320 or inference module 1340) may include the computing device 1400.

The interface module 1310 facilitates communications of the DNN system 1300 with other systems. For example, the interface module 1310 establishes communications between the DNN system 1300 with an external database to receive data that can be used to train DNNs or input into DNNs to perform tasks. As another example, the interface module 1310 supports the DNN system 1300 to distribute DNNs to other systems, e.g., computing devices configured to apply DNNs to perform tasks.

The training module 1320 trains DNNs by using a training dataset. The training module 1320 forms the training dataset. In an embodiment where the training module 1320 trains an DNN to recognize objects in images, the training dataset includes training images and training labels. The training labels describe ground-truth classifications of objects in the training images. In some embodiments, each label in the training dataset corresponds to an object in a training image. In some embodiments, a part of the training dataset may be used to initially train the DNN, and the rest of the training dataset may be held back as a validation subset used by the validation module 1330 to validate performance of a trained DNN. The portion of the training dataset not including the tuning subset and the validation subset may be used to train the DNN.

The training module 1320 also determines hyperparameters for training the DNN. Hyperparameters are variables specifying the DNN training process. Hyperparameters are different from parameters inside the DNN (e.g., weights of filters). In some embodiments, hyperparameters include variables determining the architecture of the DNN, such as number of hidden layers, etc. Hyperparameters also include variables which determine how the DNN is trained, such as batch size, number of epochs, etc. A batch size defines the number of training samples to work through before updating the parameters of the DNN. The batch size is the same as or smaller than the number of samples in the training dataset. The training dataset can be divided into one or more batches. The number of epochs defines how many times the entire training dataset is passed forward and backwards through the entire network. The number of epochs defines the number of times that the deep learning algorithm works through the entire training dataset. One epoch means that each training sample in the training dataset has had an opportunity to update the parameters inside the DNN. An epoch may include one or more batches. The number of epochs may be 13, 130, 500, 1300, or even larger.

The training module 1320 defines the architecture of the DNN, e.g., based on some of the hyperparameters. The architecture of the DNN includes an input layer, an output layer, and a plurality of hidden layers. The input layer of an DNN may include tensors (e.g., a multidimensional array) specifying attributes of the input image, such as the height of the input image, the width of the input image, and the depth of the input image (e.g., the number of bits specifying the color of a pixel in the input image). The output layer includes labels of objects in the input layer. The hidden layers are layers between the input layer and output layer. The hidden layers include one or more convolutional layers and one or more other types of layers, such as pooling layers, fully connected layers, normalization layers, softmax or logistic layers, and so on. The convolutional layers of the DNN abstract the input image to a feature map that is represented by a tensor specifying the feature map height, the feature map width, and the feature map channels (e.g., red, green, blue images include 3 channels). A pooling layer is used to reduce the spatial volume of input image after convolution. It is used between 2 convolution layers. A fully connected layer involves weights, biases, and neurons. It connects neurons in one layer to neurons in another layer. It is used to classify images between different category by training.

In the process of defining the architecture of the DNN, the training module 1320 also adds an activation function to a hidden layer or the output layer. An activation function of a layer transforms the weighted sum of the input of the layer to an output of the layer. The activation function may be, for example, a rectified linear unit activation function, a tangent activation function, or other types of activation functions.

After the training module 1320 defines the architecture of the DNN, the training module 1320 inputs a training dataset into the DNN. The training dataset includes a plurality of training samples. An example of a training sample includes an object in an image and a ground-truth label of the object. The training module 1320 modifies the parameters inside the DNN ("internal parameters of the DNN") to minimize the error between labels of the training objects that are generated by the DNN and the ground-truth labels of the objects. The internal parameters include weights of filters in the convolutional layers of the DNN. In some embodiments, the training module 1320 uses a cost function to minimize the error.

The training module 1320 may train the DNN for a predetermined number of epochs. The number of epochs is a hyperparameter that defines the number of times that the deep learning algorithm will work through the entire training dataset. One epoch means that each sample in the training dataset has had an opportunity to update internal parameters of the DNN. After the training module 1320 finishes the predetermined number of epochs, the training module 1320 may stop updating the parameters in the DNN. The DNN having the updated parameters is referred to as a trained DNN.

The validation module 1330 verifies accuracy of trained DNNs. In some embodiments, the validation module 1330 inputs samples in a validation dataset into a trained DNN and uses the outputs of the DNN to determine the model accuracy. In some embodiments, a validation dataset may be formed of some or all the samples in the training dataset. Additionally or alternatively, the validation dataset includes additional samples, other than those in the training sets. In some embodiments, the validation module 1330 may determine an accuracy score measuring the precision, recall, or a combination of precision and recall of the DNN. The validation module 1330 may use the following metrics to determine the accuracy score: Precision=TP/(TP+FP) and Recall=TP/(TP+FN), where precision may be how many the reference classification model correctly predicted (TP or true positives) out of the total it predicted (TP+FP or false positives), and recall may be how many the reference classification model correctly predicted (TP) out of the total number of objects that did have the property in question (TP+FN or false negatives). The F-score (F-score=2*PR/(P+R)) unifies precision and recall into a single measure.

The validation module 1330 may compare the accuracy score with a threshold score. In an example where the validation module 1330 determines that the accuracy score of the augmented model is lower than the threshold score, the validation module 1330 instructs the training module 1320 to re-train the DNN. In one embodiment, the training module 1320 may iteratively re-train the DNN until the occurrence of a stopping condition, such as the accuracy measurement indication that the DNN may be sufficiently accurate, or a number of training rounds having taken place.

The inference module 1340 applies the trained or validated DNN to perform tasks. For instance, the inference module 1340 inputs images into the DNN. The DNN outputs classifications of objects in the images. As an example, the DNN may be provisioned in a security setting to detect malicious or hazardous objects in images captured by security cameras. As another example, the DNN may be provisioned to detect objects (e.g., road signs, hazards, humans, pets, etc.) in images captured by cameras of an autonomous vehicle. The input to the DNN may be formatted according to a predefined input structure mirroring the way that the training dataset was provided to the DNN. The DNN may generate an output structure which may be, for example, a classification of the image, a listing of detected objects, a boundary of detected objects, or the like. In some embodiments, the inference module 1340 distributes the DNN to other systems, e.g., computing devices in communication with the DNN system 1300, for the other systems to apply the DNN to perform the tasks.

The memory 1350 stores data received, generated, used, or otherwise associated with the DNN system 1300. For example, the memory 1350 stores the datasets used by the training module 1320 and validation module 1330. The memory 1350 may also store data generated by the training module 1320 and validation module 1330, such as the hyperparameters for training DNNs, internal parameters of trained DNNs (e.g., values of tunable parameters of activation functions, such as Fractional Adaptive Linear Units (FALUs)), etc. In the embodiment of FIG. 13, the memory 1350 is a component of the DNN system 1300. In other embodiments, the memory 1350 may be external to the DNN system 1300 and communicate with the DNN system 1300 through a network.

Example Computing Device

Figure 14:
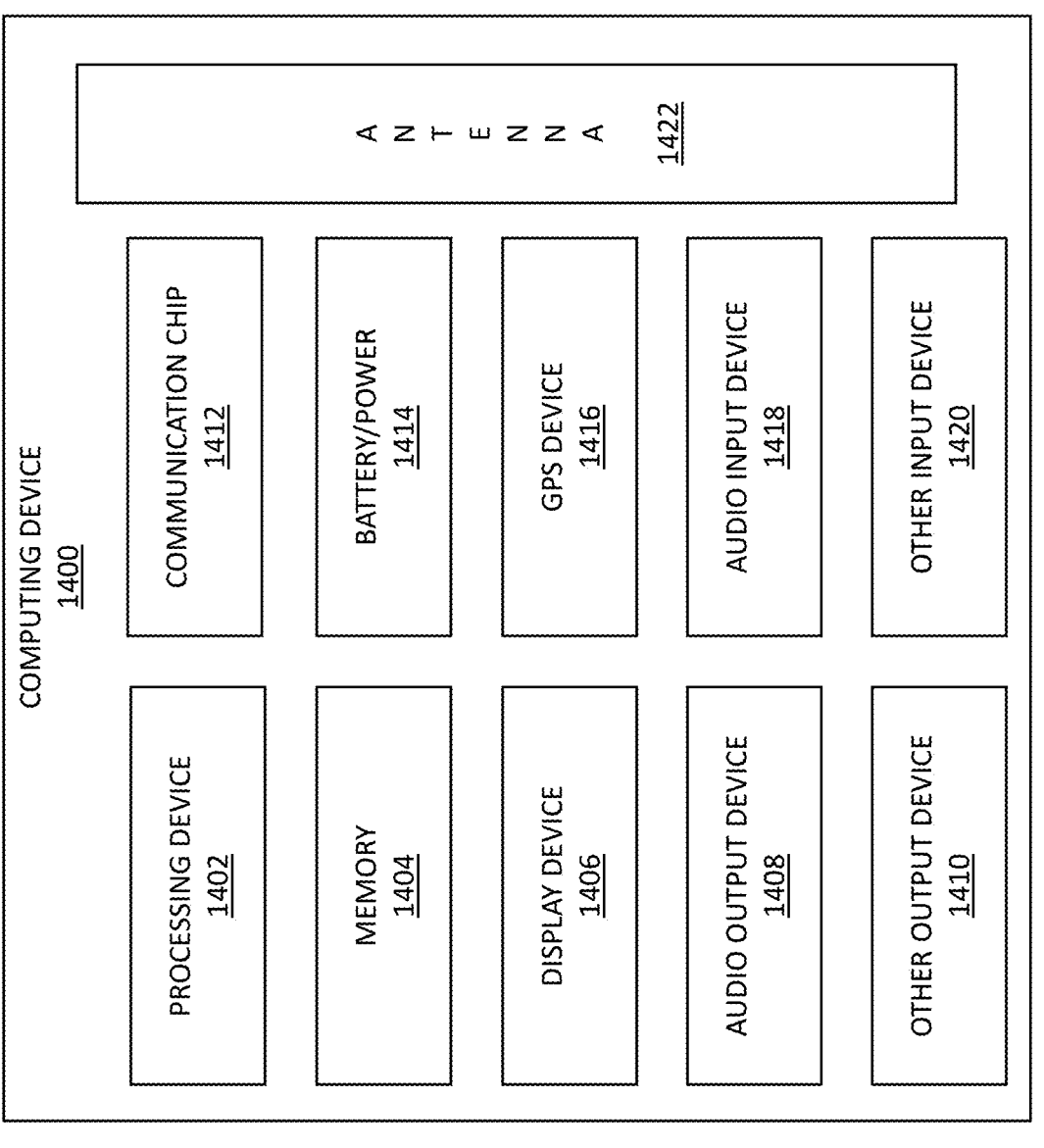
FIG. 14 is a block diagram of an example computing device, in accordance with various embodiments.

FIG. 14 is a block diagram of an example computing device 1400, in accordance with various embodiments. In some embodiments, the computing device 1400 can be used as the DNN system 1300 in FIG. 13. A number of components are illustrated in FIG. 14 as included in the computing device 1400, but any one or more of these components may be omitted or duplicated, as suitable for the application. In some embodiments, some or all of the components included in the computing device 1400 may be attached to one or more motherboards. In some embodiments, some or all of these components are fabricated onto a single system on a chip (SoC) die. Additionally, in various embodiments, the computing device 1400 may not include one or more of the components illustrated in FIG. 14, but the computing device 1400 may include interface circuitry for coupling to the one or more components. For example, the computing device 1400 may not include a display device 1406, but may include display device interface circuitry (e.g., a connector and driver circuitry) to which a display device 1406 may be coupled. In another set of examples, the computing device 1400 may not include an audio input device 1418 or an audio output device 1408, but may include audio input or output device interface circuitry (e.g., connectors and supporting circuitry) to which an audio input device 1418 or audio output device 1408 may be coupled.

The computing device 1400 may include a processing device 1402 (e.g., one or more processing devices). The processing device 1402 processes electronic data from registers and/or memory to transform that electronic data into other electronic data that may be stored in registers and/or memory. The computing device 1400 may include a memory 1404, which may itself include one or more memory devices such as volatile memory (e.g., DRAM), nonvolatile memory (e.g., read-only memory (ROM)), high bandwidth memory (HBM), flash memory, solid state memory, and/or a hard drive. In some embodiments, the memory 1404 may include memory that shares a die with the processing device 1402. In some embodiments, the memory 1404 includes one or more non-transitory computer-readable media storing instructions executable to perform operations for deep learning, e.g., the method 1100 described above in conjunction with FIG. 11 or some operations performed by the compute tile described above in conjunction with FIG. 3 (e.g., operations performed by the WCB 320). The instructions stored in the one or more non-transitory computer-readable media may be executed by the processing device 2402.

In some embodiments, the computing device 1400 may include a communication chip 1412 (e.g., one or more communication chips). For example, the communication chip 1412 may be configured for managing wireless communications for the transfer of data to and from the computing device 1400. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1412 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication chip 1412 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1412 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1412 may operate in accordance with CDMA, Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1412 may operate in accordance with other wireless protocols in other embodiments. The computing device 1400 may include an antenna 1422 to facilitate wireless communications and/or to receive other wireless communications (such as AM or FM radio transmissions).

In some embodiments, the communication chip 1412 may manage wired communications, such as electrical, optical, or any other suitable communication protocols (e.g., the Ethernet). As noted above, the communication chip 1412 may include multiple communication chips. For instance, a first communication chip 1412 may be dedicated to shorter-range wireless communications such as Wi-Fi or Bluetooth, and a second communication chip 1412 may be dedicated to longer-range wireless communications such as global positioning system (GPS), EDGE, GPRS, CDMA, WiMAX, LTE, EV-DO, or others. In some embodiments, a first communication chip 1412 may be dedicated to wireless communications, and a second communication chip 1412 may be dedicated to wired communications.

The computing device 1400 may include battery/power circuitry 1414. The battery/power circuitry 1414 may include one or more energy storage devices (e.g., batteries or capacitors) and/or circuitry for coupling components of the computing device 1400 to an energy source separate from the computing device 1400 (e.g., AC line power).

The computing device 1400 may include a display device 1406 (or corresponding interface circuitry, as discussed above). The display device 1406 may include any visual indicators, such as a heads-up display, a computer monitor, a projector, a touchscreen display, a liquid crystal display (LCD), a light-emitting diode display, or a flat panel display, for example.

The computing device 1400 may include an audio output device 1408 (or corresponding interface circuitry, as discussed above). The audio output device 1408 may include any device that generates an audible indicator, such as speakers, headsets, or earbuds, for example.

The computing device 1400 may include an audio input device 1418 (or corresponding interface circuitry, as discussed above). The audio input device 1418 may include any device that generates a signal representative of a sound, such as microphones, microphone arrays, or digital instruments (e.g., instruments having a musical instrument digital interface (MIDI) output).

The computing device 1400 may include a GPS device 1416 (or corresponding interface circuitry, as discussed above). The GPS device 1416 may be in communication with a satellite-based system and may receive a location of the computing device 1400, as known in the art.

The computing device 1400 may include another output device 1410 (or corresponding interface circuitry, as discussed above). Examples of the other output device 1410 may include an audio codec, a video codec, a printer, a wired or wireless transmitter for providing information to other devices, or an additional storage device.

The computing device 1400 may include another input device 1420 (or corresponding interface circuitry, as discussed above). Examples of the other input device 1420 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1400 may have any desired form factor, such as a handheld or mobile computer system (e.g., a cell phone, a smart phone, a mobile internet device, a music player, a tablet computer, a laptop computer, a netbook computer, an ultrabook computer, a PDA, an ultramobile personal computer, etc.), a desktop computer system, a server or other networked computing component, a printer, a scanner, a monitor, a set-top box, an entertainment control unit, a vehicle control unit, a digital camera, a digital video recorder, or a wearable computer system. In some embodiments, the computing device 1400 may be any other electronic device that processes data.

Select Examples

The following paragraphs provide various examples of the embodiments disclosed herein.

Example 1 provides a method of deep learning, the method including storing a first write transaction in an internal memory, where the first write transaction including a first data block, and the first data block is a result of one or more MAC operations performed by a compute tile for a convolutional layer in a DNN; storing a second write transaction in a buffer, where the second write transaction including a second data block, and the second data block is a result of one or more other MAC operations performed by the compute tile for the convolutional layer in the DNN; determining whether to combine the first write transaction and the second write transaction; in response to determining to combine the first data block and the second data block, generating a combined write transaction by combining the first write transaction with the second write transaction; and writing the combined write transaction into a memory at an address in the memory, where the memory is inside the compute tile.

Example 2 provides the method of example 1, where the compute tile produces an output tensor of the convolutional layer by performing a convolution with one or more filters, and the output tensor includes the first data block and the second data block.

Example 3 provides the method of example 1 or 2, where determining whether to combine the first write transaction and the second write transaction includes receiving an instruction that specifies an operation mode of a WCB; determining that the operation mode is a bypass mode; and determining not to combine the first write transaction and the second write transaction.

Example 4 provides the method of any of the preceding examples, further including generating the first write transaction or the second write transaction by combining a third write transaction and a fourth write transaction, where each of the third write transaction and the fourth write transaction includes a data block that is a result of one or more additional MAC operations performed by the compute tile.

Example 5 provides the method of any of the preceding examples, where the first write transaction further includes first metadata that specifies one or more attributes of the first data block, the second write transaction further includes second metadata that specifies one or more attributes of the second data block, and determining whether to combine the first write transaction and the second write transaction includes determining whether to combine the first write transaction and the second write transaction based on the first metadata and the second metadata.

Example 6 provides the method of example 5, where determining whether to combine the first write transaction and the second write transaction includes determining whether the first metadata or the second metadata indicates that all bytes in the first write transaction or the second write transaction are enabled, where an enabled byte is to be written into the memory.

Example 7 provides the method of example 5 or 6, where the first metadata specifies a first memory address for the first data block, the second metadata specifies a second memory address for the second data block, and determining whether to combine the first data block and the second data block includes determining whether the first memory address matches the second memory address.

Example 8 provides the method of any of the preceding examples, where an output tensor of the convolutional layer includes the first data block and the second data block, the output tensor includes one or more halo regions, data in each of the one or more halo regions is to be provided to another array of MAC units for performing further MAC operations, and determining whether to combine the first data block and the second data block includes determining whether the first data block and the second data block are in a same halo region of the one or more halo regions.

Example 9 provides the method of any of the preceding examples, where the first write transaction further includes metadata that specifies one or more attributes of the first data block, and storing the first write transaction in the internal memory includes determining a memory location for the first write transaction based on the metadata, and storing the first write transaction at the memory location in the internal memory.

Example 10 provides the method of any of the preceding examples, further including determining that there is no write activity at the memory at a first time; and writing one or more write transactions stored in the internal memory into the memory at a second time, where there is a predetermined delay between the first time and the second time.

Example 11 provides one or more non-transitory computer-readable media storing instructions executable to perform operations for deep learning, the operations including storing a first write transaction in an internal memory, where the first write transaction including a first data block, and the first data block is a result of one or more MAC operations performed by a compute tile for a convolutional layer in a DNN; storing a second write transaction in a buffer, where the second write transaction including a second data block, and the second data block is a result of one or more other MAC operations performed by the compute tile for the convolutional layer in the DNN; determining whether to combine the first write transaction and the second write transaction; in response to determining to combine the first data block and the second data block, generating a combined write transaction by combining the first write transaction with the second write transaction; and writing the combined write transaction into a memory at an address in the memory, where the memory is inside the compute tile.

Example 12 provides the one or more non-transitory computer-readable media of example 11, where the compute tile produces an output tensor of the convolutional layer by performing a convolution with one or more filters, and the output tensor includes the first data block and the second data block.

Example 13 provides the one or more non-transitory computer-readable media of example 11 or 12, where determining whether to combine the first write transaction and the second write transaction includes receiving an instruction that specifies an operation mode of a WCB; determining that the operation mode is a bypass mode; and determining not to combine the first write transaction and the second write transaction.

Example 14 provides the one or more non-transitory computer-readable media of any one of examples 11-13, where the operations further include generating the first write transaction or the second write transaction by combining a third write transaction and a fourth write transaction, where each of the third write transaction and the fourth write transaction includes a data block that is a result of one or more additional MAC operations performed by the compute tile.

Example 15 provides the one or more non-transitory computer-readable media of any one of examples 11-14, where the first write transaction further includes first metadata that specifies one or more attributes of the first data block, the second write transaction further includes second metadata that specifies one or more attributes of the second data block, and determining whether to combine the first write transaction and the second write transaction includes determining whether to combine the first write transaction and the second write transaction based on the first metadata and the second metadata.

Example 16 provides the one or more non-transitory computer-readable media of example 15, where determining whether to combine the first write transaction and the second write transaction includes determining whether the first metadata or the second metadata indicates that all bytes in the first write transaction or the second write transaction are enabled, where an enabled byte is to be written into the memory.

Example 17 provides the one or more non-transitory computer-readable media of example 15 or 16, where the first metadata specifies a first memory address for the first data block, the second metadata specifies a second memory address for the second data block, and determining whether to combine the first data block and the second data block includes determining whether the first memory address matches the second memory address.

Example 18 provides the one or more non-transitory computer-readable media of any one of examples 11-17, where an output tensor of the convolutional layer includes the first data block and the second data block, the output tensor includes one or more halo regions, data in each of the one or more halo regions is to be provided to another array of MAC units for performing further MAC operations, and determining whether to combine the first data block and the second data block includes determining whether the first data block and the second data block are in a same halo region of the one or more halo regions.

Example 19 provides the one or more non-transitory computer-readable media of any one of examples 11-18, where the first write transaction further includes metadata that specifies one or more attributes of the first data block, and storing the first write transaction in the internal memory includes determining a memory location for the first write transaction based on the metadata, and storing the first write transaction at the memory location in the internal memory.

Example 20 provides the one or more non-transitory computer-readable media of any one of examples 11-19, where the operations further include determining that there is no write activity at the memory at a first time; and writing one or more write transactions stored in the internal memory into the memory at a second time, where there is a predetermined delay between the first time and the second time.

Example 21 provides a DNN accelerator, the DNN accelerator including an array of MAC units configured to execute a convolution on an input tensor with a number of filters to produce an output tensor; a memory; and a WCB that is configured to store a first write transaction in an internal memory of the WCB, where the first write transaction including a first data block, and the first data block is a result of one or more MAC operations performed by the array of MAC units, store a second write transaction in a buffer of the WCB, where the second write transaction including a second data block, and the second data block is a result of one or more other MAC operations performed by the array of MAC units, determine whether to combine the first write transaction and the second write transaction, in response to determining to combine the first data block and the second data block, generate a combined write transaction by combining the first write transaction with the second write transaction, and write the combined write transaction into the memory at an address in the memory.

Example 22 provides the DNN accelerator of example 21, where the WCB is configured to determine whether to combine the first write transaction and the second write transaction by receiving an instruction that specifies an operation mode of the WCB; determining that the operation mode is a bypass mode; and determining not to combine the first write transaction and the second write transaction.

Example 23 provides the DNN accelerator of example 21 or 22, where the WCB is further configured to generate the first write transaction or the second write transaction by combining a third write transaction and a fourth write transaction, where each of the third write transaction and the fourth write transaction includes a data block that is a result of one or more additional MAC operations performed by the compute tile.

Example 24 provides the DNN accelerator of any one of examples 21-23, where the first write transaction further includes first metadata that specifies one or more attributes of the first data block, the second write transaction further includes second metadata that specifies one or more attributes of the second data block, and the WCB is configured to determine whether to combine the first write transaction and the second write transaction includes determining whether to combine the first write transaction and the second write transaction based on the first metadata and the second metadata.

Example 25 provides the DNN accelerator of any one of examples 21-24, where the WCB is further configured to determine that there is no write activity at the memory at a first time; and write one or more write transactions stored in the internal memory into the memory at a second time, where there is a predetermined delay between the first time and the second time.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A method of deep learning, the method comprising:
storing a first write transaction in an internal memory, wherein the first write transaction comprising a first data block, and the first data block is a result of one or more multiply-accumulate (MAC) operations performed by a compute tile for a convolutional layer in a deep neural network (DNN);
storing a second write transaction in a buffer, wherein the second write transaction comprising a second data block, and the second data block is a result of one or more other MAC operations performed by the compute tile for the convolutional layer in the DNN;
determining whether to combine the first write transaction and the second write transaction;
in response to determining to combine the first data block and the second data block, generating a combined write transaction by combining the first write transaction with the second write transaction; and
writing the combined write transaction into a memory at an address in the memory, wherein the memory is inside the compute tile.

2. The method of claim 1, wherein the compute tile produces an output tensor of the convolutional layer by performing a convolution with one or more filters, and the output tensor includes the first data block and the second data block.

3. The method of claim 1, wherein determining whether to combine the first write transaction and the second write transaction comprises:
receiving an instruction that specifies an operation mode of a write combine buffer;
determining that the operation mode is a bypass mode; and
determining not to combine the first write transaction and the second write transaction.

4. The method of claim 1, further comprising:
generating the first write transaction or the second write transaction by combining a third write transaction and a fourth write transaction,
wherein each of the third write transaction and the fourth write transaction comprises a data block that is a result of one or more additional MAC operations performed by the compute tile.

5. The method of claim 1, wherein:
the first write transaction further comprises first metadata that specifies one or more attributes of the first data block,
the second write transaction further comprises second metadata that specifies one or more attributes of the second data block, and
determining whether to combine the first write transaction and the second write transaction comprises determining whether to combine the first write transaction and the second write transaction based on the first metadata and the second metadata.

6. The method of claim 5, wherein determining whether to combine the first write transaction and the second write transaction comprises:
determining whether the first metadata or the second metadata indicates that all bytes in the first write transaction or the second write transaction are enabled, wherein an enabled byte is to be written into the memory.

7. The method of claim 5, wherein:
the first metadata specifies a first memory address for the first data block,
the second metadata specifies a second memory address for the second data block, and
determining whether to combine the first data block and the second data block comprises determining whether the first memory address matches the second memory address.

8. The method of claim 1, wherein:
an output tensor of the convolutional layer includes the first data block and the second data block,
the output tensor comprises one or more halo regions,
data in each of the one or more halo regions is to be provided to another array of MAC units for performing further MAC operations, and
determining whether to combine the first data block and the second data block comprises determining whether the first data block and the second data block are in a same halo region of the one or more halo regions.

9. The method of claim 1, wherein:
the first write transaction further comprises metadata that specifies one or more attributes of the first data block, and
storing the first write transaction in the internal memory comprises:
determining a memory location for the first write transaction based on the metadata, and
storing the first write transaction at the memory location in the internal memory.

10. The method of claim 1, further comprising:
determining that there is no write activity at the memory at a first time; and
writing one or more write transactions stored in the internal memory into the memory at a second time, wherein there is a predetermined delay between the first time and the second time.

11. One or more non-transitory computer-readable media storing instructions executable to perform operations for deep learning, the operations comprising:
storing a first write transaction in an internal memory, wherein the first write transaction comprising a first data block, and the first data block is a result of one or more multiply-accumulate (MAC) operations performed by a compute tile for a convolutional layer in a deep neural network (DNN);
storing a second write transaction in a buffer, wherein the second write transaction comprising a second data block, and the second data block is a result of one or more other MAC operations performed by the compute tile for the convolutional layer in the DNN;
determining whether to combine the first write transaction and the second write transaction;
in response to determining to combine the first data block and the second data block, generating a combined write transaction by combining the first write transaction with the second write transaction; and
writing the combined write transaction into a memory at an address in the memory, wherein the memory is inside the compute tile.

12. The one or more non-transitory computer-readable media of claim 11, wherein the compute tile produces an output tensor of the convolutional layer by performing a convolution with one or more filters, and the output tensor includes the first data block and the second data block.

13. The one or more non-transitory computer-readable media of claim 11, wherein determining whether to combine the first write transaction and the second write transaction comprises:

receiving an instruction that specifies an operation mode of a write combine buffer;

determining that the operation mode is a bypass mode; and determining not to combine the first write transaction and the second write transaction.

14. The one or more non-transitory computer-readable media of claim 11, wherein the operations further comprise:

generating the first write transaction or the second write transaction by combining a third write transaction and a fourth write transaction, wherein each of the third write transaction and the fourth write transaction comprises a data block that is a result of one or more additional MAC operations performed by the compute tile.

15. The one or more non-transitory computer-readable media of claim 11, wherein:

the first write transaction further comprises first metadata that specifies one or more attributes of the first data block, the second write transaction further comprises second metadata that specifies one or more attributes of the second data block, and determining whether to combine the first write transaction and the second write transaction comprises determining whether to combine the first write transaction and the second write transaction based on the first metadata and the second metadata.

16. The one or more non-transitory computer-readable media of claim 15, wherein determining whether to combine the first write transaction and the second write transaction comprises:

determining whether the first metadata or the second metadata indicates that all bytes in the first write transaction or the second write transaction are enabled, wherein an enabled byte is to be written into the memory.

17. The one or more non-transitory computer-readable media of claim 15, wherein:

the first metadata specifies a first memory address for the first data block, the second metadata specifies a second memory address for the second data block, and determining whether to combine the first data block and the second data block comprises determining whether the first memory address matches the second memory address.

18. The one or more non-transitory computer-readable media of claim 11, wherein:

an output tensor of the convolutional layer includes the first data block and the second data block, the output tensor comprises one or more halo regions, data in each of the one or more halo regions is to be provided to another array of MAC units for performing further MAC operations, and determining whether to combine the first data block and the second data block comprises determining whether the first data block and the second data block are in a same halo region of the one or more halo regions.

19. The one or more non-transitory computer-readable media of claim 11, wherein:

the first write transaction further comprises metadata that specifies one or more attributes of the first data block, and storing the first write transaction in the internal memory comprises:

determining a memory location for the first write transaction based on the metadata, and storing the first write transaction at the memory location in the internal memory.

20. The one or more non-transitory computer-readable media of claim 11, wherein the operations further comprise:

determining that there is no write activity at the memory at a first time; and writing one or more write transactions stored in the internal memory into the memory at a second time, wherein there is a predetermined delay between the first time and the second time.

21. A deep neural network (DNN) accelerator, the DNN accelerator comprising:

an array of multiple-accumulate (MAC) units configured to execute a convolution on an input tensor with a number of filters to produce an output tensor;

a memory; and a write combine buffer (WCB) that is configured to:

store a first write transaction in an internal memory of the WCB, wherein the first write transaction comprising a first data block, and the first data block is a result of one or more MAC operations performed by the array of MAC units, store a second write transaction in a buffer of the WCB, wherein the second write transaction comprising a second data block, and the second data block is a result of one or more other MAC operations performed by the array of MAC units, determine whether to combine the first write transaction and the second write transaction, in response to determining to combine the first data block and the second data block, generate a combined write transaction by combining the first write transaction with the second write transaction, and write the combined write transaction into the memory at an address in the memory.

22. The DNN accelerator of claim 21, wherein the WCB is configured to determine whether to combine the first write transaction and the second write transaction by:

receiving an instruction that specifies an operation mode of the WCB;

determining that the operation mode is a bypass mode; and determining not to combine the first write transaction and the second write transaction.

23. The DNN accelerator of claim 21, wherein the WCB is further configured to:

generate the first write transaction or the second write transaction by combining a third write transaction and a fourth write transaction, wherein each of the third write transaction and the fourth write transaction comprises a data block that is a result of one or more additional MAC operations performed by the array of MAC units.

24. The DNN accelerator of claim 21, wherein:

the first write transaction further comprises first metadata that specifies one or more attributes of the first data block, the second write transaction further comprises second metadata that specifies one or more attributes of the second data block, and the WCB is configured to determine whether to combine the first write transaction and the second write transaction comprises determining whether to combine the first write transaction and the second write transaction based on the first metadata and the second metadata.

25. The DNN accelerator of claim 21, wherein the WCB is further configured to:

determine that there is no write activity at the memory at a first time; and write one or more write transactions stored in the internal memory into the memory at a second time, wherein there is a predetermined delay between the first time and the second time.

* * * * *